United States Patent
Kodera et al.

(10) Patent No.: US 10,099,722 B2
(45) Date of Patent: Oct. 16, 2018

(54) STEERING CONTROL APPARATUS

(71) Applicant: JTEKT CORPORATION, Osaka-shi, Osaka (JP)

(72) Inventors: Takashi Kodera, Okazaki (JP); Naoki Yamano, Okazaki (JP); Hidenori Itamoto, Tajimi (JP); Yoshihiro Yamashita, Okazaki (JP); Koji Anraku, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 28 days.

(21) Appl. No.: 15/292,505

(22) Filed: Oct. 13, 2016

(65) Prior Publication Data

US 2017/0113720 A1  Apr. 27, 2017

(30) Foreign Application Priority Data

Oct. 27, 2015  (JP) ................. 2015-210975

(51) Int. Cl.
*B62D 9/00* (2006.01)
*B62D 6/00* (2006.01)
(Continued)

(52) U.S. Cl.
CPC ............. *B62D 6/002* (2013.01); *B62D 5/008* (2013.01); *B62D 5/0472* (2013.01); *B62D 6/008* (2013.01)

(58) Field of Classification Search
CPC .................................................... B62D 9/002
See application file for complete search history.

(56) References Cited

U.S. PATENT DOCUMENTS

2012/0245799 A1* 9/2012 Ono .................. B62D 5/008
                                                             701/42
2015/0375780 A1  12/2015 Chai et al.
(Continued)

FOREIGN PATENT DOCUMENTS

EP       1 577 194 A1   9/2005
JP       2006-218880 A   8/2006
(Continued)

OTHER PUBLICATIONS

Mar. 17, 2017 Extended Search Report issued in European Patent Application No. 16195566.1.

*Primary Examiner* — Adam D Tissot
*Assistant Examiner* — Michael A Berns
(74) *Attorney, Agent, or Firm* — Oliff PLC

(57) ABSTRACT

A steering control apparatus is provided which suppresses possible vibration of a steering system resulting from differential steering processing when a steering angle or a steered angle has a large value. A differential steering processing circuit calculates a differential steering correction amount based on a difference value of a target steering angle, and increases or reduces the target steering angle using the calculated amount to obtain a target steered angle. A limiting reaction force setting processing circuit increases a limiting reaction force when a maximum value of the target steering angle and the target steered angle is equal to or larger than a common threshold. When the maximum value approaches the common threshold, an angle-sensitive gain setting processing circuit reduces an angle-sensitive gain so as to correct and reduce the differential steering correction amount.

11 Claims, 14 Drawing Sheets

(51) Int. Cl.
*B62D 5/04* (2006.01)
*B62D 5/00* (2006.01)

(56) References Cited

U.S. PATENT DOCUMENTS

| | | | |
|---|---|---|---|
| 2016/0114832 A1* | 4/2016 | Taniguchi | B62D 6/008 |
| | | | 701/41 |
| 2016/0221601 A1* | 8/2016 | Barthomeuf | B62D 5/0469 |
| 2017/0021858 A1* | 1/2017 | Kodera | B62D 6/008 |
| 2017/0021859 A1* | 1/2017 | Kodera | B62D 6/008 |
| 2017/0253266 A1* | 9/2017 | Minamiguchi | B62D 5/0463 |

FOREIGN PATENT DOCUMENTS

| | | |
|---|---|---|
| JP | 4269451 B2 | 5/2009 |
| WO | 2014/128818 A1 | 8/2014 |

* cited by examiner

STEERING CONTROL APPARATUS

INCORPORATION BY REFERENCE

The disclosure of Japanese Patent Application No. 2015-210975 filed on Oct. 27, 2015 including the specification, drawings and abstract is incorporated herein by reference in its entirety.

BACKGROUND OF THE INVENTION

1. Field of the Invention

The invention relates to a steering control apparatus that outputs an operation signal to a steering system.

2. Description of the Related Art

For example, Japanese Patent No. 4269451 describes a steering control apparatus that outputs an operation signal to a steering system including a variable-steering-angle-ratio actuator. The actuator varies a steering angle ratio that is a ratio between the steering angle and a steered angle while transmitting a torque applied to a steering wheel to steered wheels. The control apparatus executes what is called differential steering processing of setting an operation angle through which a rotation angle for an output side of the variable-steering-angle-ratio actuator is changed with respect to a rotation angle for an input side thereof that is the steering angle such that the operation angle is larger when a variation speed of the steering angle is high than when the variation speed of the steering angle is low.

For the steering system, upper limit values are specified for the steering angle and the steered angle according to the structure of the system. The steering system also includes a steering control apparatus that performs angle limitation control in which increases in steering angle and steered angle are limited before the steering angle and the steered angle reach the structural upper limit values thereof. For the steering control apparatus, the inventor has found that the steering system may be vibrated when the differential steering processing is executed in a region where the angle limitation control is performed. Even if the steering control apparatus is not equipped with a controller that performs the angle limitation control, the steering system may be vibrated when the differential steering processing is executed near the structural upper limit values. Even if the differential steering processing is based on a steered angle velocity of steered wheels rather than on the variation speed of the steering angle, the steering system may also be vibrated when the differential steering processing is executed near the structural upper limit values or in the region where the angle limitation control is performed.

SUMMARY OF THE INVENTION

An object of the invention is to provide a steering control apparatus that suppresses vibration of a steering system resulting from differential steering processing when a steering angle or a steered angle has a large value.

A configuration allowing the object to be accomplished and effects of the configuration will be described below.

According to an aspect of the invention, a steering control apparatus that outputs an operation signal to a steering system includes a steering operation processing circuit that outputs an operation signal to the steering system to steer steered wheels of a vehicle, in accordance with operation of a steering wheel, and a differential steering processing circuit that executes increase and reduction processing for increasing or reducing an amount of steering operation performed on the steered wheels by the steering operation processing circuit according to a variation speed of a steering angle when the steering wheel is operated so as to vary the steering angle that is a rotation angle of the steering wheel. The increase and reduction processing is processing for adding a correction amount in the same direction as the variation speed of the steering angle to the amount of steering operation. The differential steering processing circuit includes a steering limitation processing circuit that limits the increase and reduction processing when at least one of the steered angle of the steered wheels and the steering angle reaches a threshold.

In this configuration, when at least one of the steered angle and the steering angle reaches the corresponding threshold, the steering limitation processing circuit limits the increase and reduction processing for the amount of steering operation executed by the differential steering processing circuit. Therefore, the increase and reduction processing for the steered angle executed by the differential steering processing circuit can be limited before the magnitude of the actual steering angle or steered angle reaches the upper limit value by setting the threshold for the steering angle (steering angle threshold) to be equal to or smaller than the structural upper limit value of the steering angle or setting the threshold for the steered angle (steered angle threshold) to be equal to or smaller than the structural upper limit value of the steered angle. Even when the steering control apparatus is performing angle limitation control that limits the magnitude of the steering angle or the steered angle, the increase and reduction processing for the steered angle executed by the differential steering processing circuit can also be limited before the magnitude of the steering angle or the steered angle is significantly limited by the angle limitation control by setting, besides the upper limit value defined based on the structure of the steering system, the steering angle threshold or the steered angle threshold according to a region where the angle limitation control is performed. This allows suppression of possible vibration of the steering system resulting from the differential steering processing when the steering angle or the steered angle has a large value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
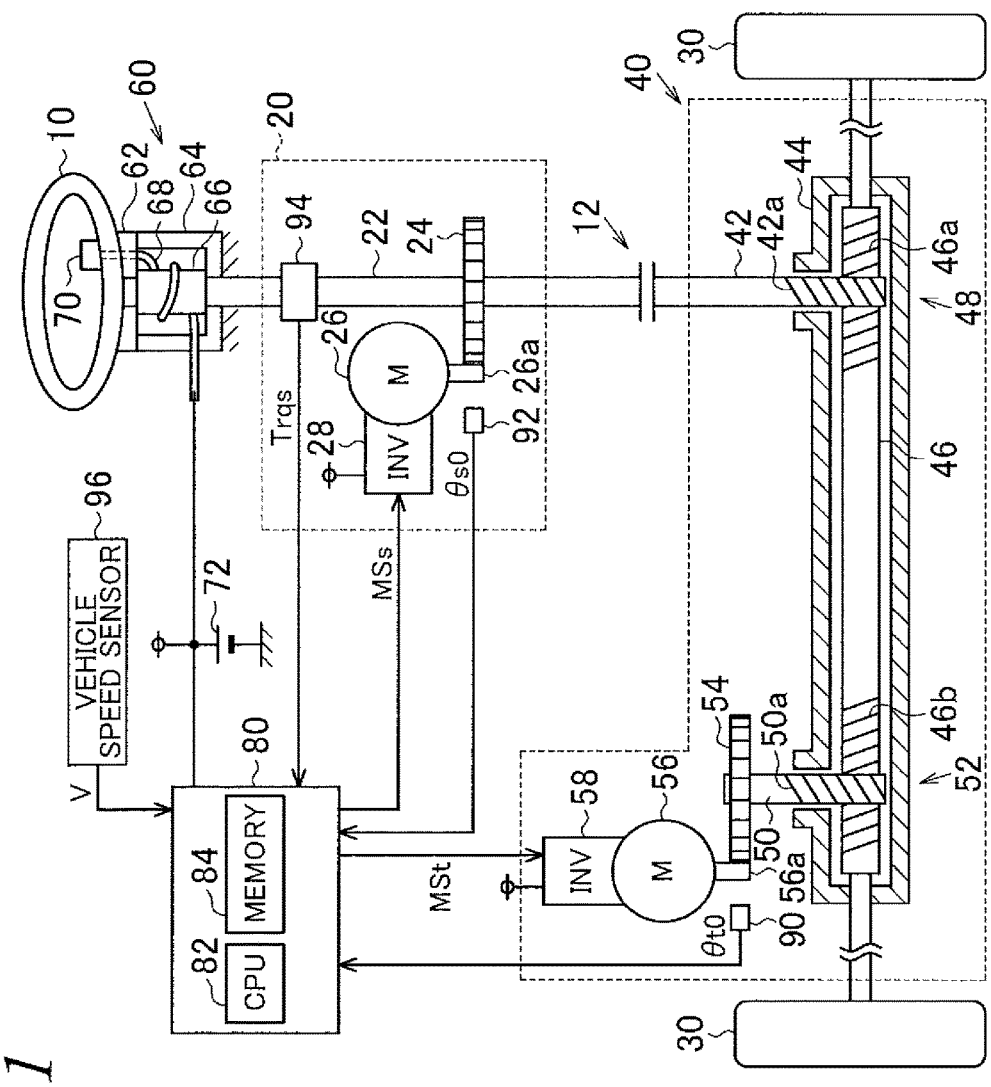
FIG. 1 is a diagram depicting a steering control apparatus according to a first embodiment and an operation target of the steering control apparatus.

A first embodiment of the invention will be described below with reference to a first embodiment of the invention. As depicted in FIG. 1, in a steering system according to the first embodiment, a steering wheel. 10 is connected to a reaction force actuator 20 that applies a reaction force resisting operation of the steering wheel 10. The reaction force actuator 20 includes a steering shaft 22 fixed to the steering wheel 10, a reaction force side reduction gear 24, a reaction force motor 26 with a rotating shaft 26a coupled to the reaction force side reduction gear 24, and an inverter 28 that drives the reaction force motor 26. The reaction force motor 26 is a surface permanent magnet synchronous motor (hereinafter referred to as an SPMSM).

The steering shaft 22 is capable of being coupled to a pinion shaft 42 of a steering operation actuator 40 via a clutch 12. The steering operation actuator 40 includes a first rack and pinion mechanism 48, a second rack and pinion mechanism 52, a steering operation side motor 56 including an SPMSM, and an inverter 58.

The first rack and pinion mechanism 48 includes a rack shaft 46 and the pinion shaft 42 arranged so as to form a predetermined crossing angle. First rack teeth 46a formed on the rack shaft 46 mesh with pinion teeth 42a formed on the pinion shaft 42. Steered wheels 30 are coupled to respective opposite ends of the rack shaft 46 via respective tie rods.

The second rack and pinion mechanism 52 includes the rack shaft 46 and a pinion shaft 50 arranged so as to form a predetermined crossing angle. Second rack teeth 46b formed on the rack shaft 46 mesh with pinion teeth 50a formed on the pinion shaft 50.

The pinion shaft 50 is connected to a rotating shaft 56a of the steering operation side motor 56 via a steering operation side reduction gear 54. The inverter 58 is connected to the steering operation side motor 56. The rack shaft 46 is housed in a rack housing 44.

A spiral cable apparatus 60 is coupled to the steering wheel 10. The spiral cable apparatus 60 includes a first housing 62 fixed to the steering wheel 10, a second housing 64 fixed to a vehicle body, a tubular member 66 that is housed in a space defined by the first housing 62 and the second housing 64 and that is fixed to the second housing 64, and a spiral cable 68 wound around the tubular member 66. The steering shaft 22 is inserted into the tubular member 66. The spiral cable 68 is electric wiring that connects together a horn 70 fixed to the steering wheel 10, a battery 72 fixed to the vehicle body, and the like.

A steering control apparatus (control apparatus 80) performs control that allows steered wheels 30 to be steered in accordance with operation of the steering wheel 10 by operating the steering system including the reaction force actuator 20 and the steering operation actuator 40. That is, in the present embodiment, a steer-by-wire system is implemented by the reaction force actuator 20 and the steering operation actuator 40. The control apparatus 80 performs the control allowing the steered wheels 30 to be steered in accordance with operation of the steering wheel 10 with the clutch 12 kept in a disconnected state. At this time, the control apparatus 80 loads a rotation angle θs0 of the rotating shaft 26a of the reaction force motor 26 detected by a steering wheel side sensor 92 and a steering torque Trqs applied to the steering shaft 22 and detected by a torque sensor 94. The control apparatus 80 also loads a rotation angle θt0 of the rotating shaft 56a of the steering operation side motor 56 detected by a steering operation side sensor 90 and a vehicle speed V detected by a vehicle speed sensor 96.

Specifically, the control apparatus 80 includes a central processing unit (CPU 82) and a memory 84. The CPU 82 executes a program stored in the memory 84 to operate the steering operation actuator 40 and the reaction force actuator 20.

Figure 2:
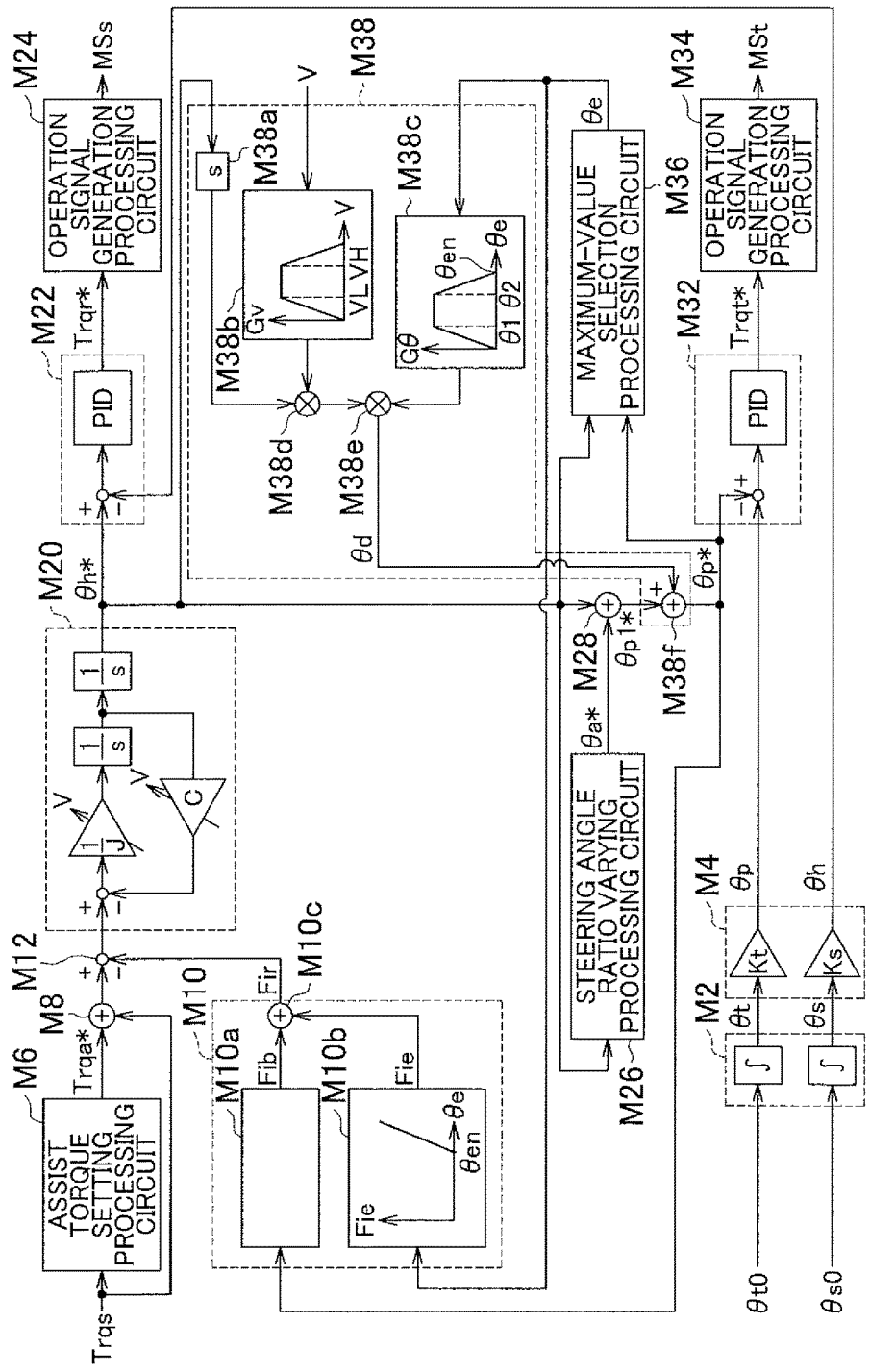
FIG. 2 is a block diagram of the first embodiment.

FIG. 2 illustrates a part of processing executed by the control apparatus 80. The processing illustrated in FIG. 2 is a part of the processing implemented by the CPU 82 executing the program stored in the memory 84; FIG. 2 illustrates each type of implemented process.

An integral processing circuit M2 converts the rotation angle θs0 detected by the steering wheel side sensor 92 and the rotation angle θt0 detected by the steering operation side sensor 90 into numerical values for a region of angles wider than a region of angles from 0° to 360° to obtain rotation angles θs, θt. That is, for example, when the steering wheel 10 is maximally operated clockwise or counterclockwise from a neutral position at which the vehicle travels straight ahead, the rotating shaft 26a makes a plurality of rotations. Therefore, when, for example, the rotating shaft 26a makes two rotations in a predetermined direction from a state in which the steering wheel 10 is in the neutral position, the integral processing circuit M2 has an output value of 720°. The integral processing circuit M2 has an output value of zero at the neutral position.

A measuring unit setting processing circuit M4 calculates a steering angle θh by multiplying an output value from the steering wheel side sensor 92 processed by the integral processing circuit M2, by a conversion factor Ks, and calculates a steered angle θp by multiplying an output value from the steering operation side sensor 90 processed by the integral processing circuit M2, by a conversion factor Kt. The conversion factor Ks is defined in accordance with the ratio between the rotation speed of the reaction force side reduction gear 24 and the rotation speed of the rotating shaft 26a of the reaction force motor 26. The conversion factor Ks allows the amount of variation in the rotation angle θs of the rotating shaft 26a to be converted into the amount of rotation of the steering wheel 10. Thus, the steering angle θh corresponds to the rotation angle of the steering wheel 10 with reference to the neutral position. The conversion factor Kt is the product of the ratio between the rotation speed of the steering operation side reduction gear 54 and the rotation speed of the rotating shaft 56a of the steering operation side motor 56 and the ratio of the rotation speed of the pinion shaft 50 and the rotation speed of the pinion shaft 42. Consequently, the amount of rotation of the rotating shaft 56a is converted into the amount of rotation of the steering wheel 10 measured given the clutch 12 is engaged.

In the processing in FIG. 2, the rotation angles θs, θt, the steering angle θh, and the steered angle θp are positive when being rotation angles in a predetermined direction and are negative when being rotation angles in the opposite direction. That is, when, for example, the rotating shaft 26a rotates in the direction opposite to the predetermined direction from a state in which with the steering wheel 10 is in the neutral position, the integral processing circuit M2 has a negative output value. However, this is an example of logic for a control system. In the specification, large rotation angles θs, θt, a large steering angle θh, and a large steered angle θp mean large amounts of variation with respect to the neutral position. In other words, large rotation angles mean that the parameters that may take positive and negative values as described above have large absolute values.

An assist torque setting processing circuit M6 sets an assist torque Trqa* based on the steering torque Trqs. The value of the assist torque Trqa* increases as the steering torque Trqs increases. An addition processing circuit M8 adds the steering torque Trqs to the assist torque Trqa* and outputs the resultant torque.

A reaction force setting processing circuit M10 sets a reaction force Fir that resists rotation of the steering wheel 10. Specifically, in the reaction force setting processing circuit M10, a base reaction force setting processing circuit M10a sets a base reaction force Fib corresponding to operation of the steering wheel 10, and a limiting reaction force setting processing circuit M10b sets a limiting reaction force Fie resisting further operation of the steering wheel 10 toward an upper limit value when the amount of rotation of the steering wheel 10 approaches an allowable maximum value. In the reaction force setting processing circuit M10, an addition processing circuit M10c adds the base reaction force Fib and the limiting reaction force Fie together and outputs the result as the reaction force Fir.

A deviation calculation processing circuit M12 subtracts the reaction force Fir from the output from the addition processing circuit M8 and outputs the result. A target steering angle calculation processing circuit M20 sets a target steering angle θh* based on the output value from the deviation calculation processing circuit M12. In this case, a model formula is utilized which is expressed using Equation (c1) that associates the output value Δ from the deviation calculation processing circuit M12 with the target steering angle θh*.

$$\Delta = C \cdot \theta h^{*\prime} + J \cdot \theta h^{*\prime\prime} \tag{c1}$$

A model expressed by Equation (c1) is a model specifying a relation between the torque and the rotation angle of a rotating shaft that rotates in conjunction with rotation of the steering wheel 10 when the steering wheel 10 and the steered wheels 30 mechanically coupled together. In Equation (c1), a viscosity coefficient C is modeled friction or the like of the steering system, and a factor of inertia J is modeled inertia of the steering system. The viscosity coefficient C and the factor of inertia J are variably set according to the vehicle speed V. A first-order differential of θh* with respect to time is denoted by θh*′, and a second-order differential of θh* with respect to time is denoted by θh*″.

A steering angle feedback processing circuit M22 sets a target reaction force torque Trqr* generated by the reaction force motor 26 as an amount of operation needed to perform feedback control for causing the steering angle θh to be adjusted to the target steering angle θh*. Specifically, the target reaction force torque Trqr* is the sum of respective output values from a proportional element, an integral element, and an differential element to each of which a value resulting from subtraction of the steering angle θh from the target steering angle θh* is input.

An operation signal generation processing circuit M24 generates an operation signal MSs for the inverter 28 based on the target reaction force torque Trqr* and outputs the operation signal MSs to the inverter 28. This is implemented by, for example, well-known current feedback control in which a command value for a q-axis current is set based on the target reaction force torque Trqr* and in which a voltage command value for d-q axes is set as an amount of operation needed to perform feedback control for causing a current on the d-d axes to be adjusted to a command value. The d-axis current may be controllably adjusted to zero. However, when the reaction force motor 26 has a high rotation speed, field weakening control may be performed with the absolute value of the d-axis current set to a value larger than zero. In a low-rotation-speed region, the absolute value of the d-axis current may be set to a value larger than zero.

A steering angle ratio varying processing circuit M26 sets a target operation angle θa* that is used to variably set a steering angle ratio that is a ratio between the steering angle θh and the steered angle θp, based on the target steering angle θh*. An addition processing circuit M28 calculates a target steered angle θp1* by adding the target operation angle θa* to the target steering angle θh*.

A steered angle feedback processing circuit M32 sets a target steered torque Trqt* to be generated by the steering operation side motor 56 as an amount of operation needed to perform feedback control for causing the steered angle θp to be adjusted to the target steered angle θp*, which is determined according to the target steered angle θp1*. Specifically, the target steered torque Trqt* is the sum of respective output values from a proportional element, an integral element, and a differential element to each of which a value resulting from subtraction of the steered angle θp from the target steered angle θp* is input.

An operation signal generation processing circuit M34 generates an operation signal MSt for the inverter 58 based on the target steered torque Trqt* and outputs the operation signal MSt to the inverter 58. This may be performed similarly to the operation signal generation processing executed by the operation signal generation processing circuit M24.

A maximum-value selection processing circuit M36 selects and outputs a larger one (maximum value θe) of the target steering angle θh* and the target steered angle θp*. The base reaction force setting processing circuit M10a receives the target steering angle θh* as an input. The limiting reaction force setting processing circuit M10b receives the maximum value θe as an input to set the limiting reaction force Fie. This setting is intended to controllably increase a force resisting a further increase in magnitude of the steering angle of the steering wheel 10 both immediately before an end of the rack shaft 46 comes into contact with the rack housing 44 resulting from axial displacement of the rack shaft 46 and immediately before the steering wheel 10 rotates up to the upper limit value determined through the spiral cable 68. This setting will be described below.

Figure 3:
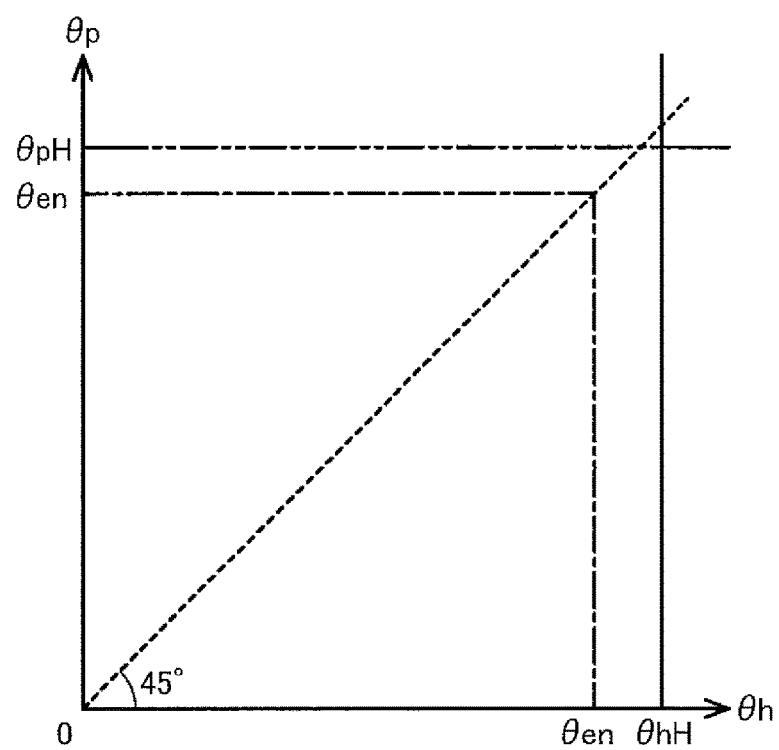
FIG. 3 is a diagram illustrating thresholds for a steering angle and a steered angle according to the first embodiment.

FIG. 3 illustrates a relation between upper limit values θhH and θpH of the steering angle θh and the steered angle θp, respectively. As illustrated in FIG. 3, in the present embodiment, the upper limit value θhH of the steering angle θh and the upper limit value θpH of the steered angle θp have a substantially equal value. This is realized by setting of measuring units for the steering angle θh and the steered angle θp performed by the measuring unit setting processing circuit M4. That is, in the present embodiment, the spiral cable 68 has a slight margin for the length thereof so as to enable the steering wheel 10 to rotate further slightly when, with the clutch 12 engaged, the rack shaft 46 is displaced in an axial direction until the rack shaft 46 comes into contact with the rack housing 44. Thus, the upper limit value θhH of the steering angle θh is substantially equal to the upper limit value θpH of the steered angle θp when the measuring unit setting processing circuit M4 sets the steering angle θh to be the rotation angle of the steering wheel 10 and sets the steered angle θp to be the rotation angle of the steering wheel 10 obtained given the target operation angle θa* is zero.

Thus, in the present embodiment, a common threshold θen is set for the steering angle θh and the steered angle θp so as to controllably increase the reaction force of the steering wheel 10 before both arrival of the steering angle θh at the upper limit value θhH and arrival of the steered angle θp at the upper limit value θpH. The limiting reaction force setting processing circuit M10b depicted in FIG. 2 includes a map specifying a relation between the maximum value θe and the limiting reaction force Fie. In the map, a value is set to be larger than zero when the magnitude of the maximum value θe is equal to or larger than the common threshold θen and to be large enough to preclude human beings from performing further operation particularly when the maximum value θe increases to some degree above the common threshold θen. Although, FIG. 2 only depicts the limiting reaction force Fie increasing as the maximum value θe starts at zero and increases in a predetermined rotating direction, the absolute value of the limiting reaction force Fie increases even when the maximum value θe increases in a direction opposite to the predetermined direction. Note that, the limiting reaction force Fie in the processing in FIG. 2 is negative when the maximum value θe increases in the direction opposite to the predetermined rotating direction.

As depicted in FIG. 2, in the present embodiment, a differential steering processing circuit M38 is provided which executes processing for compensating for a response delay in a steering operation performed on the steered wheels 30 in response to operation of the steering wheel 10. In the differential steering processing circuit M38, a difference calculation processing circuit M38a calculates a variation speed (rate per unit time) of the target steering angle θh* by executing a time-wise difference calculation on the target steering angle θh* serving as a parameter that is used to calculate the variation speed of the steering angle, and outputs the result. On the other hand, a basic-gain setting processing circuit M38b sets a basic gain Gv according to the vehicle speed V. In the differential steering processing circuit M38, a multiplication processing circuit M38d multiplies the output value from the difference calculation processing circuit M38a by the basic gain Gv. Furthermore, in the differential steering processing circuit M38, an angle-sensitive gain setting processing circuit M38c calculates an angle-sensitive gain Gθ based on the maximum value θe, and a multiplication processing circuit M38e multiplies an output value from the multiplication processing circuit M38d by the angle-sensitive gain Gθ and outputs the result as a differential steering correction amount θd. Next, in the differential steering processing circuit M38, an addition processing circuit M38f calculates the target steered angle θp* by adding the differential steering correction amount θd to the target steered angle θp1*, and outputs the target steered angle θpt.

The differential steering correction amount θd is an amount in the same direction as that of the variation speed of the target steering angle θh*. Therefore, for example, when the target steering angle θh* is a value for a right turn and the variation speed of the target steering angle θh* is also a value for the right turn, the target steered angle θp* and the target steered angle θp1* are values for the right turn, and the target steered angle θp* has a larger absolute value than the target steered angle θp1*. For example, when the target steering angle θh* is a value for a left turn and the variation speed of the target steering angle θh* is also a value for the left turn, the target steered angle θp* and the target steered angle θp1* are values for the left turn, and the target steered angle θp* has a larger absolute value than the target steered angle θp1*. In contrast, for example, when the target steering angle θh* is a value for the right turn and the variation speed of the target steering angle θh* is a value for the left turn, the target steered angle θp* has a smaller absolute value than the target steered angle θp1*.

The basic-gain setting processing circuit M38b sets the value of the basic gain Gv to decrease consistently with the decrease of the vehicle speed V when the vehicle speed V is equal to or lower than a low speed threshold VL. This is based on the idea that, although the processing executed by the differential steering processing circuit M38 is intended to compensate for a response delay in the steering operation performed on the steered wheels 30 in response to operation of the steering wheel 10, the response delay is less likely to be problematic when the vehicle speed V is low. When the vehicle speed V is equal to or higher than a high speed threshold VH, the basic-gain setting processing circuit M38b sets the value of the basic gain Gv to decrease with increasing vehicle speed V. This is intended to suppress unwanted movement of the steered wheels 30 during high-speed traveling. The basic gain Gv has a value of zero or larger.

The angle-sensitive gain setting processing circuit M38c sets the value of the angle-sensitive gain Gθ to decrease consistently with the decrease of the magnitude of the maximum value θe in a region of angles equal to or larger than a first angle θ1 at which the deviation of the maximum value θe with respect to the neutral position is equal to or smaller than a specified amount. This setting is intended to provide a dead zone to suppress possible vibration of the steering wheel 10 resulting from the differential steering processing near the neutral position. When the magnitude of the maximum value θe is equal to or larger than a second angle θ2 that is smaller by a predetermined amount than the common threshold θen, the angle-sensitive gain setting processing circuit M38c sets the value of the angle-sensitive gain Gθ to decrease with increasing magnitude of the maximum value θe. In particular, when the magnitude of the maximum value θe is equal to or larger than the common threshold θen, the angle-sensitive gain setting processing circuit M38c sets the angle-sensitive gain Gθ to zero. This setting is intended to suppress possible vibration of the steering system resulting from the differential steering processing in a region where angle limitation control is performed in which the magnitudes of the steered angle θp and the steering angle θh are limited using the limiting reaction force Fie. The angle-sensitive gain Gθ is set to a value that is equal to or larger than zero and that is equal to or smaller than one regardless of whether the maximum value θe is a value for the right turn or a value for the left turn.

Now, effects of the present embodiment will be described. For example, if the vehicle speed V is between the low speed threshold VL and the high speed threshold VH, when the steering wheel 10 is turned to the right or the left to increase the absolute value of the steering angle θh, the absolute value of the target steering angle θh* increases and accordingly increases the output value from the multiplication processing circuit M38d. Thus, when the angle-sensitive gain Gθ does not lie in a region where the angle-sensitive gain Gθ has a small value, the absolute value of the target steered angle θp* is corrected to a value larger than the absolute value of the target steered angle θp1* based on the differential steering correction amount θd.

The steering angle feedback processing circuit M22 sets the target reaction force torque Trqr*, which allows the steering angle θh to be set to the target steering angle θh*. The target steering angle θh* is calculated as an amount of operation that causes the target steering angle calculation processing circuit M20 to make the sum of the steering torque Trqs and the assist torque Trqa* equal to the reaction force Fir. If the maximum value θe is to further increase above the common threshold θen, the limiting reaction force Fie increases rapidly compared to the base reaction force Fib. In this case, the reaction force Fir increases rapidly, and the target steering angle θh* is controlled such that the sum of the steering torque Trqs and the assist torque Trqa* is equal to the rapidly increased reaction force Fir. Consequently, a torque (target reaction force torque Trqr*) exerted by the reaction force motor 26 to return the steering wheel 10 to the neutral position increases to hinder the user from further continuously turning the steering wheel 10. The target steering angle θh* has a lower variation speed at this time than before the maximum value θe reaches the common threshold θen.

When the maximum value θe reaches the common threshold θen, the angle-sensitive gain Gθ is zero, and thus, the differential steering correction amount θd is also zero. Therefore, the target steered angle θp* is equal to the target steered angle θp1*.

The above-described present embodiment produces effects described below.

(1) When the maximum value θe approaches the common threshold θen, the differential steering correction amount θd is corrected and reduced. This allows suppression of possible vibration of the steering system resulting from the differential steering processing when the maximum value θe is a large value. A significant fluctuation in differential steering correction amount θd caused by a rapid variation in target steered angle θp* or target steering angle θh* is estimated to be the cause of vibration of the steering system occurring if the differential steering processing is executed when the magnitude of the maximum value θe is equal to or larger than the common threshold θen. That is, when the magnitude of the maximum value θe is equal to or larger than the common threshold θen, the limiting reaction force Fie increases rapidly, resulting in an increased variation speed of the target steering angle θh* and thus of the target steered angle θp*. In contrast, in the present embodiment, even if the maximum value θe reaches the common threshold θen to rapidly increase the limiting reaction force Fie and thus rapidly reducing the variation speed of the target steering angle θh*, the differential steering correction amount θd itself is zero.

Vibration of the steering system in the present embodiment means vibration of the steering wheel 10 and vibration of the steering operation actuator 40. In particular, the vibration of the steering wheel 10 includes vibration caused by the reaction force controlled by the steering angle feedback processing circuit M22.

(2) The maximum value θe is utilized both as a parameter used to set the limiting reaction force Fie and as a parameter used to set the angle-sensitive gain Gθ. Consequently, the correction processing based on the differential steering correction amount θd can be adequately limited before the steering system vibrates as a result of correction of the target steered angle θp* based on the differential steering correction amount θd.

(3) When the maximum value θe is equal to or larger than the second angle θ2, which is smaller by the predetermined amount than the common threshold θen, the value of the angle-sensitive gain Gθ is set to decrease as the maximum value θe increases. Thus, the amount of increase or reduction in the amount of steering operation that is adjusted by the differential steering processing circuit M38 decreases as the maximum value θe approaches the common threshold θen. Thus, compared to the case where the amount of increase or reduction in the amount of steering operation that is adjusted by the differential steering processing circuit M38 is reduced in a step-by-step manner until the amount reaches zero, the present embodiment allows the control to be restrained from being rapidly varied.

(4) The steering system has been found to vibrate when the differential steering processing is executed near the neutral position of the steered angle θp. In this regard, in the present embodiment, the vibration can be suppressed by correcting and reducing the magnitude of the differential steering correction amount θd by which the target steered angle θp* is increased or reduced, near the neutral position of the target steered angle θp*. Furthermore, a single parameter of the angle-sensitive gain Gθ allows handling of both vibration near the neutral position and vibration near the common threshold θen.

With reference to the drawings, a second embodiment will be described below with differences from the first embodiment focused on.

Figure 4:
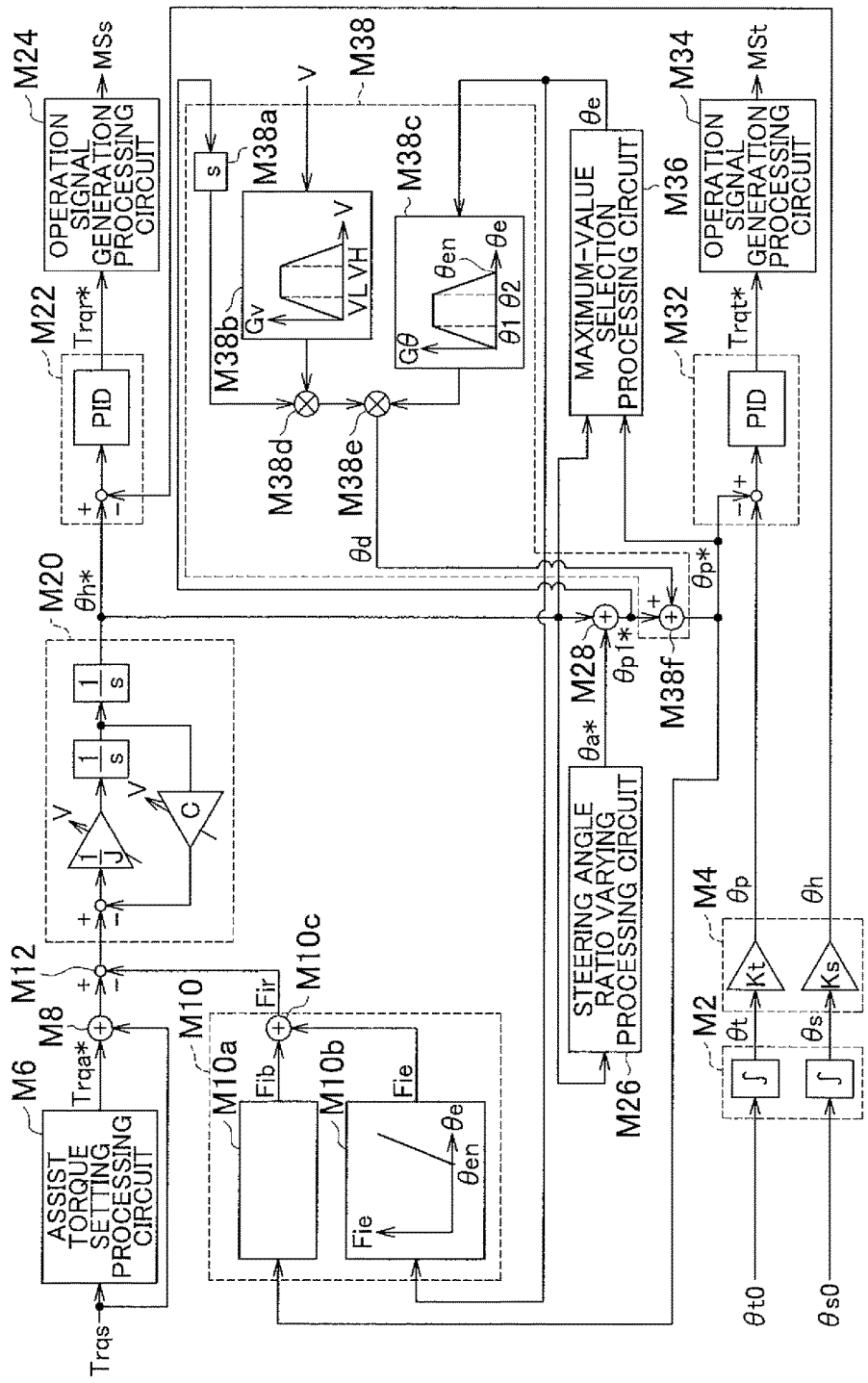
FIG. 4 is a block diagram of a second embodiment.

FIG. 4 illustrates a part of the processing executed by the control apparatus 80. The processing illustrated in FIG. 4 corresponds to partial modification of the processing illustrated in FIG. 2. Processes in FIG. 4 corresponding to particular processes illustrated in FIG. 2 are denoted by the same reference numerals for convenience.

As depicted in FIG. 4, in the present embodiment, the target steered angle θp1* is used as a parameter that is used to calculate the variation speed of the steering angle. The target steered angle θp1* is a value resulting from addition of the target operation angle θa* to the target steering angle θh*. The target operation angle θa* is only a parameter that is used to adjust the steering angle ratio, and thus, a variation in target steered angle θp1* is considered to correspond to a variation in target steering angle θh*. Thus, the target steered angle θp1* is used as a parameter that is used to calculate the variation speed of the steering angle.

With reference to the drawings, a third embodiment will be described below with differences from the first embodiment focused on.

Figure 5:
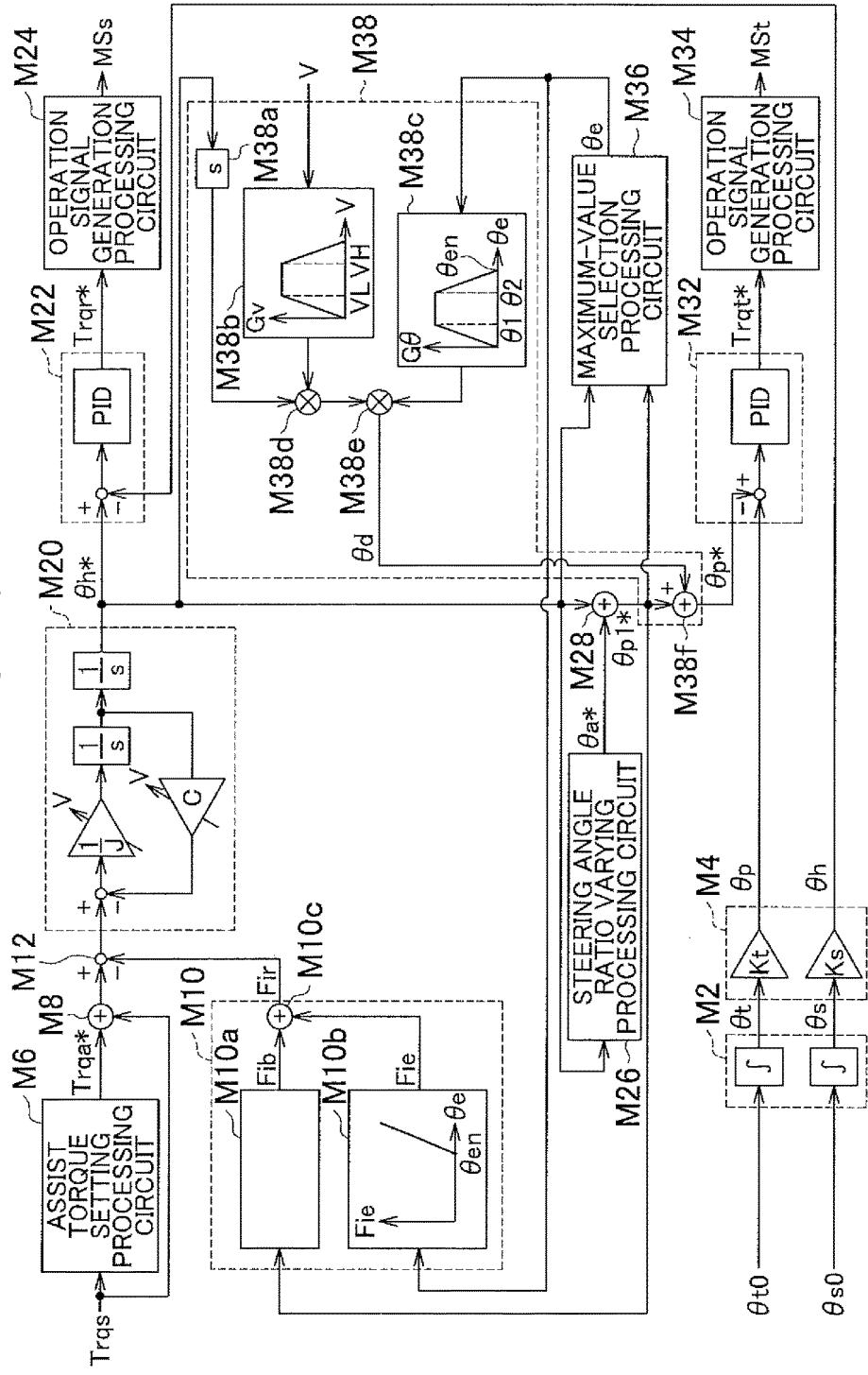
FIG. 5 is a block diagram of a third embodiment.

FIG. 5 illustrates a part of the processing executed by the control apparatus 80. The processing illustrated in FIG. 5 corresponds to partial modification of the processing illustrated in FIG. 2. Processes in FIG. 5 corresponding to particular processes illustrated in FIG. 2 are denoted by the same reference numerals for convenience.

As depicted in FIG. 5, in the present embodiment, the target steered angle θp1* is input to the base reaction force setting processing circuit M10a. The maximum-value selection processing circuit M36 selects the maximum value θe from the target steering angle θh* and the target steered angle θp1*. Therefore, the differential steering correction amount θd is not reflected in the maximum value θe. Thus, in the present embodiment, the differential steering correction amount θd set by the differential steering processing circuit M38 is not reflected in the reaction force Fir. Therefore, the differential steering correction amount θd is also not reflected in the operation signal MSs output to the reaction force actuator 20. The differential steering correction amount θd is reflected only in the operation signal MSt output to the steering operation actuator 40.

In the above-described configuration, even given the non-use of the angle-sensitive gain Gθ, vibration caused by the reaction force as in the first embodiment is suppressed when the maximum value θe exceeds the common threshold θen. However, if the angle-sensitive gain Gθ is not utilized, when the maximum value θe exceeds the common threshold θen, the steering operation actuator 40 vibrates, and at this time, the steering wheel 10 also vibrates. This is expected to be because vibration of the steering operation actuator 40 is transmitted to the steering wheel 10.

With reference to the drawings, a fourth embodiment will be described below with differences from the third embodiment focused on.

Figure 6:
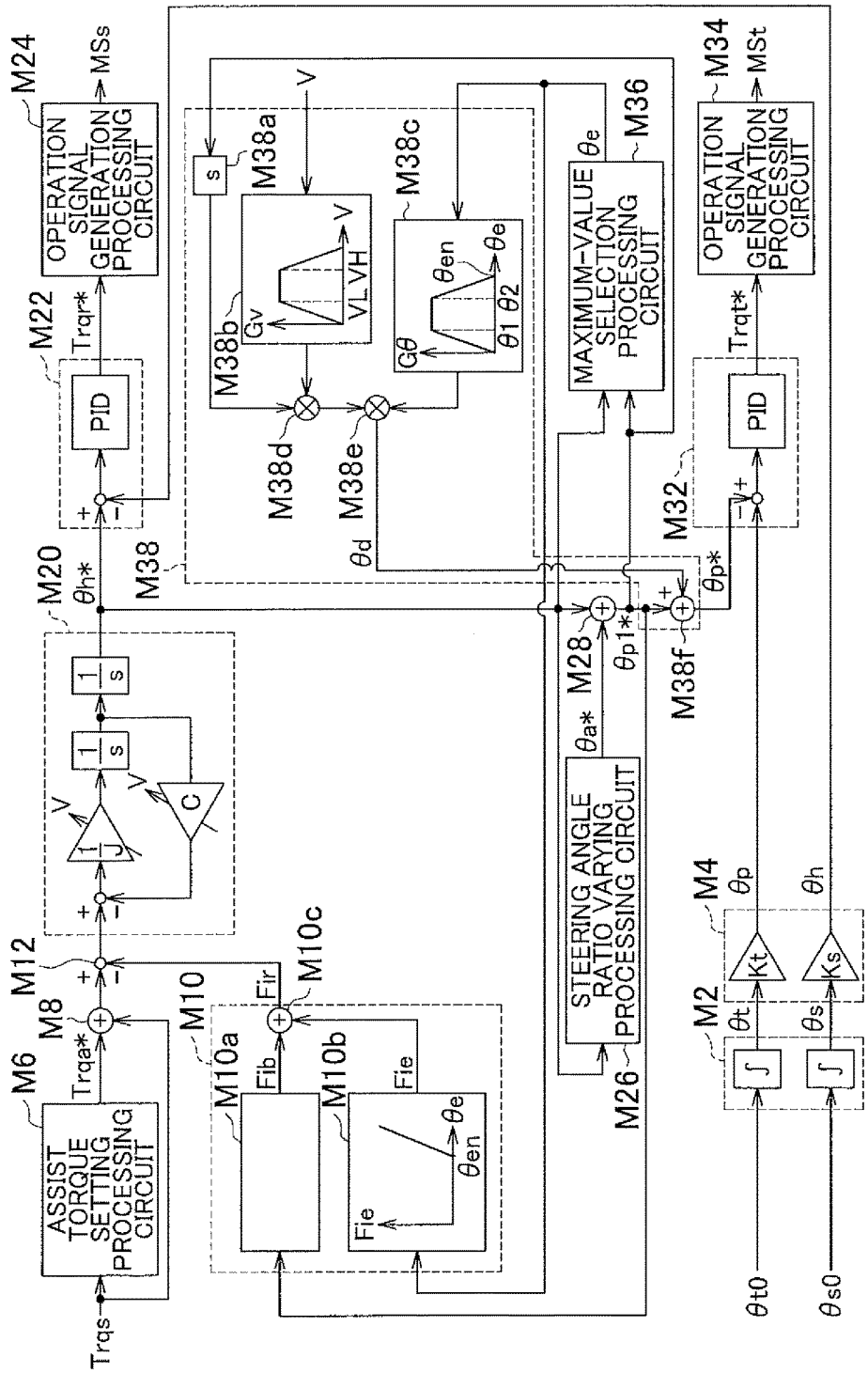
FIG. 6 is a block diagram of a fourth embodiment.

FIG. 6 illustrates a part of the processing executed by the control apparatus 80. The processing illustrated in FIG. 6 corresponds to partial modification of the processing illustrated in FIG. 5. Processes in FIG. 6 corresponding to particular processes illustrated in FIG. 5 are denoted by the same reference numerals for convenience.

In the present embodiment, the target steered angle θpt* is used as a parameter that is used to calculate the variation speed of the steering angle. In the present embodiment as well, the differential steering correction amount θd set by the differential steering processing circuit M38 is not reflected in the reaction force Fir.

With reference to the drawings, a fifth embodiment will be described below with differences from the first embodiment focused on.

Figure 7:
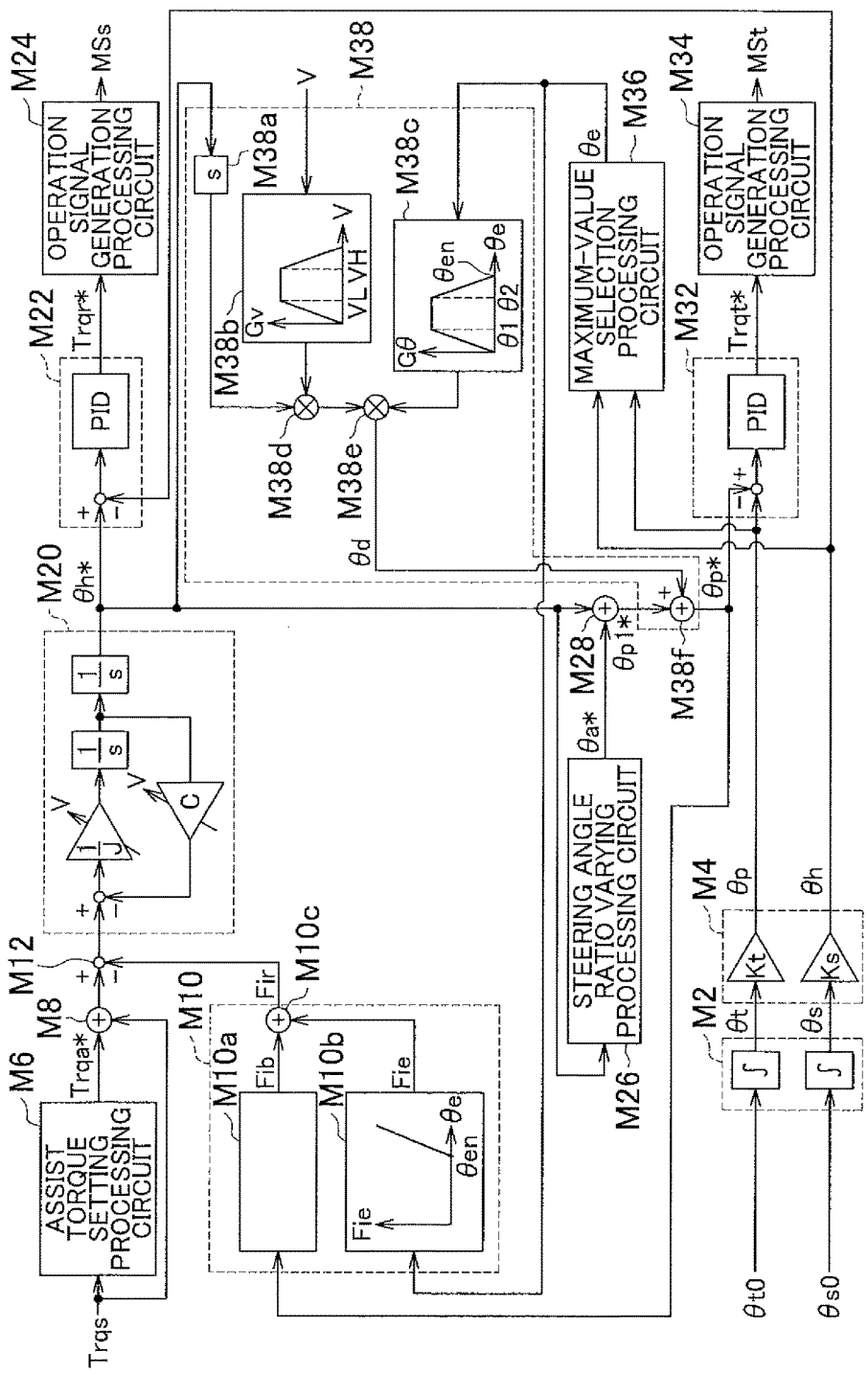
FIG. 7 is a block diagram of a fifth embodiment.

FIG. 7 illustrates a part of the processing executed by the control apparatus 80. The processing illustrated in FIG. 7 corresponds to partial modification of the processing illustrated in FIG. 2. Processes in FIG. 7 corresponding to particular processes illustrated in FIG. 2 are denoted by the same reference numerals for convenience. As depicted in FIG. 7, in the present embodiment, the maximum-value selection processing circuit M36 selects the maximum value θe from the steering angle θh that is a detection value and the steered angle θp that is a detection value.

With reference to the drawings, a sixth embodiment will be described below with differences from the fifth embodiment focused on.

Figure 8:
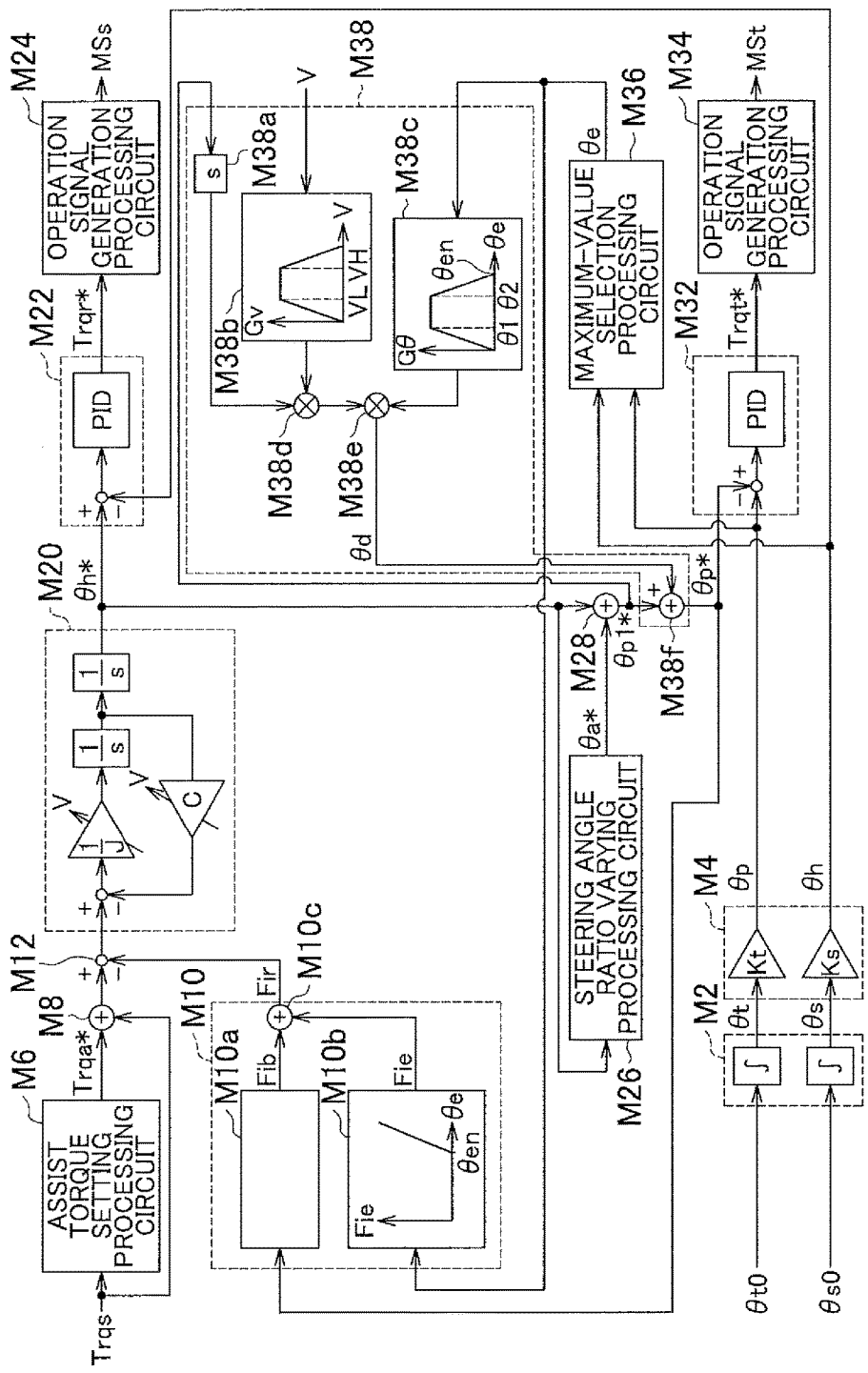
FIG. 8 is a block diagram of a sixth embodiment.

FIG. 8 illustrates a part of the processing executed by the control apparatus 80. The processing illustrated in FIG. 8 corresponds to partial modification of the processing illustrated in FIG. 7. Processes in FIG. 8 corresponding to particular processes illustrated in FIG. 7 are denoted by the same reference numerals for convenience. As depicted in FIG. 8, in the present embodiment, the target steered angle θp1* is used as a parameter that is used to calculate the variation speed of the steering angle.

With reference to the drawings, a seventh embodiment will be described below with differences from the fifth embodiment focused on.

Figure 9:
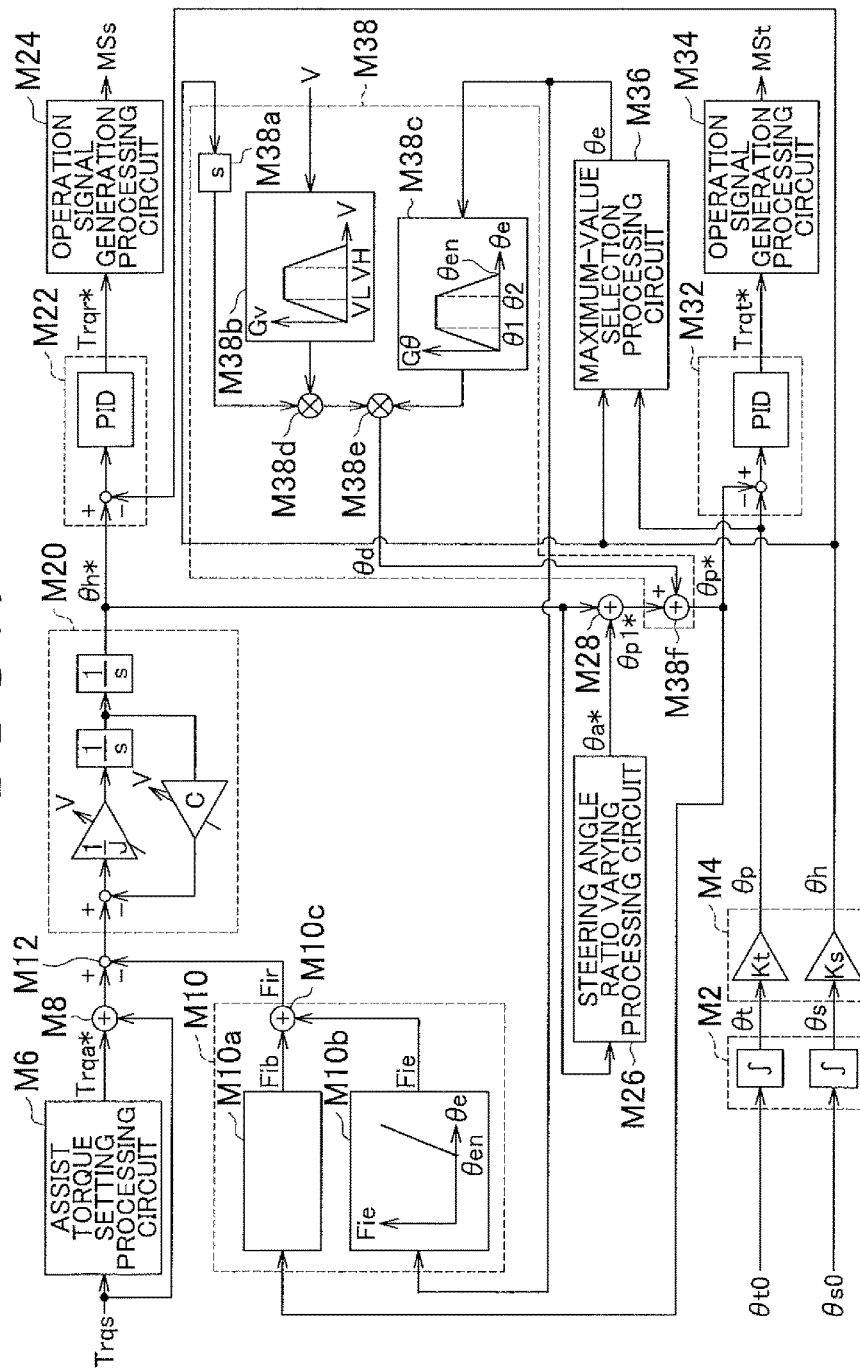
FIG. 9 is a block diagram of a seventh embodiment.

FIG. 9 illustrates a part of the processing executed by the control apparatus 80. The processing illustrated in FIG. 9 corresponds to partial modification of the processing illustrated in FIG. 7. Processes in FIG. 9 corresponding to particular processes illustrated in FIG. 7 are denoted by the same reference numerals for convenience. As depicted in FIG. 9, in the present embodiment, the steering angle θh that is a detection value is used as a parameter that is used to calculate the variation speed of the steering angle.

With reference to the drawings, an eighth embodiment will be described below with differences from the fifth embodiment focused on.

Figure 10:
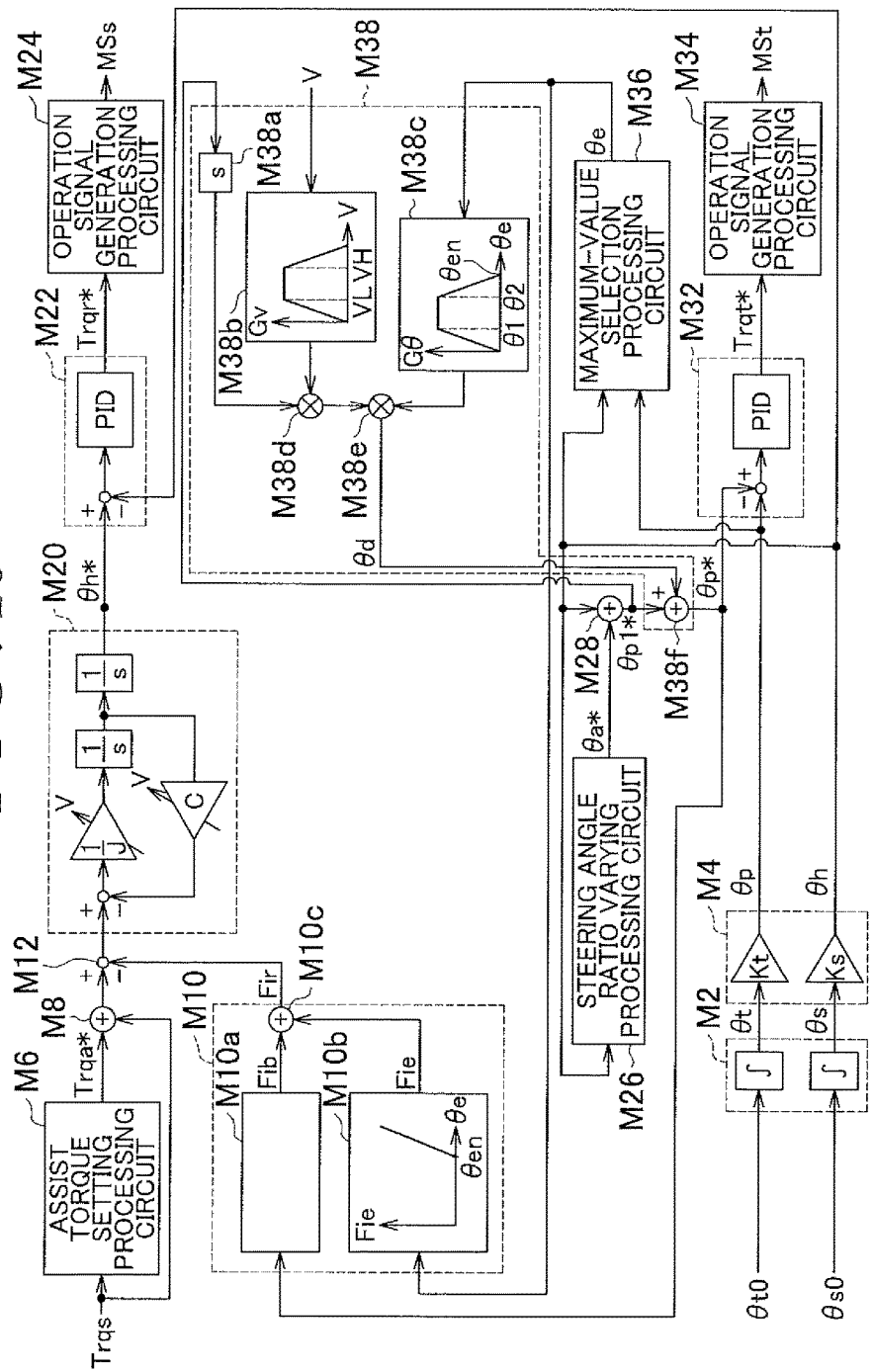
FIG. 10 is a block diagram of an eighth embodiment.

FIG. 10 illustrates a part of the processing executed by the control apparatus 80. The processing illustrated in FIG. 10 corresponds to partial modification of the processing illustrated in FIG. 7. Processes in FIG. 10 corresponding to particular processes illustrated in FIG. 7 are denoted by the same reference numerals for convenience.

As depicted in FIG. 10, in the present embodiment, the steering angle ratio varying processing circuit M26 outputs the target operation angle θa* based on the steering angle θh instead of the target steering angle θh*. The addition processing circuit M28 adds the target operation angle θa* to the steering angle θh that is a detection value to obtain the target steered angle θp1*. The target steered angle θp1* is used as a parameter that is used to calculate the variation speed of the steering angle.

With reference to the drawings, a ninth embodiment will be described below with differences from the first embodiment focused on.

Figure 11:
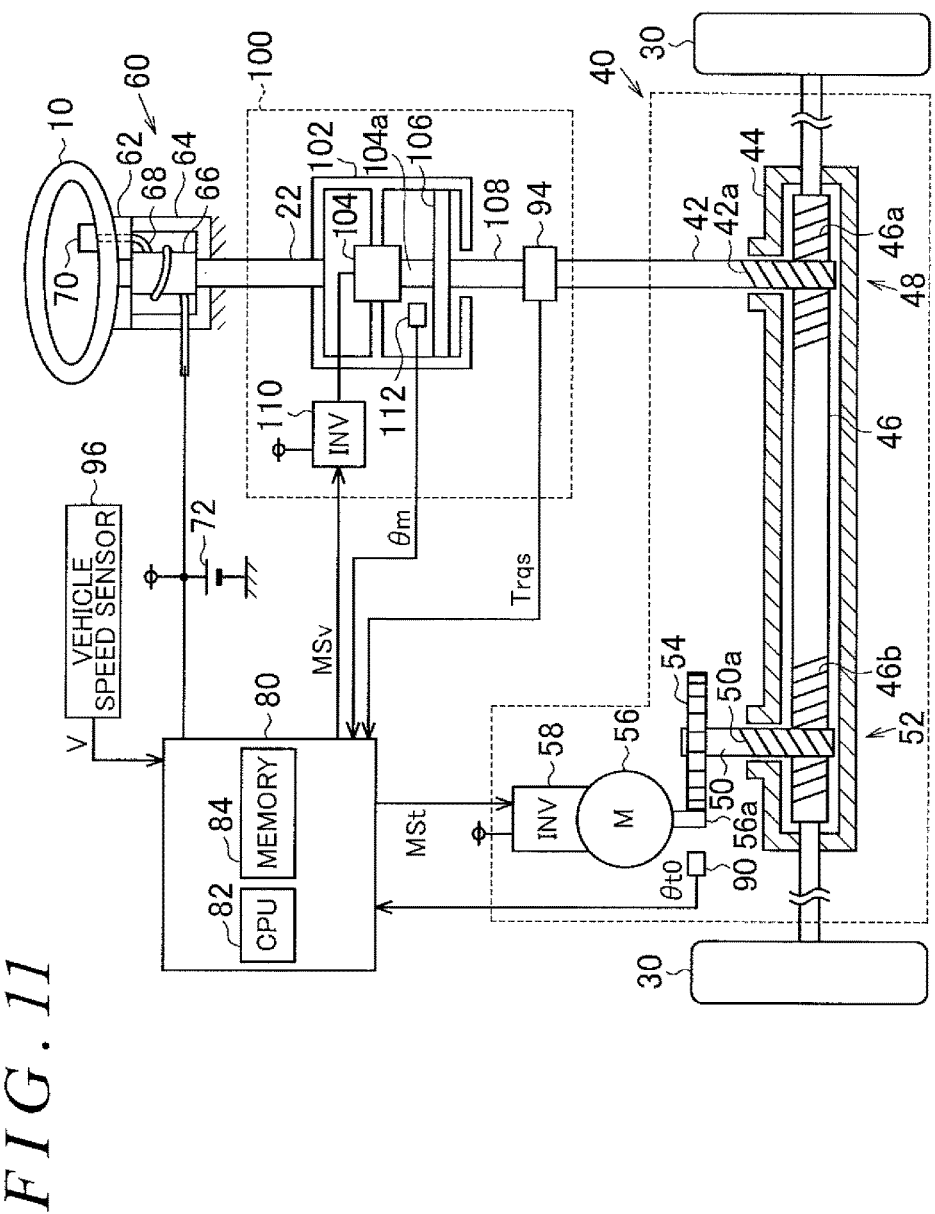
FIG. 11 is a diagram depicting a steering control apparatus according to a ninth embodiment and an operation target of the steering control apparatus.

FIG. 11 is a system configuration according to the present embodiment. Members in FIG. 11 corresponding to particular members illustrated in FIG. 1 are denoted by the same reference numerals for convenience. A steering system according to the present embodiment includes a variable-steering-angle-ratio actuator 100 instead of the reaction force actuator 20. The variable-steering-angle-ratio actuator 100 includes a housing 102 coupled to the steering shaft 22 so as to be rotatable integrally with the steering shaft 22, an SPMSM (VGR motor 104) housed inside the housing 102, an inverter 110, and a reduction mechanism 106. The reduction mechanism 106 includes a mechanism including three rotary elements that can make differential rotations, for example, a planetary gear mechanism or strain wave gearing. The three rotary elements included in the reduction mechanism 106 are coupled to the housing 102, a rotating shaft 104a of the VGR motor 104, and an output shaft 108 coupled to the pinion shaft 42. That is, in the reduction mechanism 106, the rotation speed of the output shaft 108 is uniquely determined by the rotation speed of the housing 102 and the rotation speed of the VGR motor 104. In the variable-steering-angle-ratio actuator 100, the rotation angle of the output shaft 108 relative to the steering shaft 22 is varied through the reduction mechanism 106 by adding rotation of the rotating shaft 104a of the VGR motor 104 to rotation of the steering shaft 22 involved in operation of the steering wheel 10 and transmitting the resultant rotation to the output shaft 108. Consequently, the steering angle ratio is variably set which is the ratio of the steered angle θp to the steering angle θh. The addition in this case includes both addition and subtraction. The rotation angle of the output shaft 108 relative to the steering shaft 22 is referred to as an operation angle θa of the output shaft 108.

A steering angle ratio side sensor 112 detects a rotation angle θm of the rotating shaft 104a of the VGR motor 104. The torque sensor 94 detects the torque (steering torque Trqs) of the output shaft 108.

Figure 12:
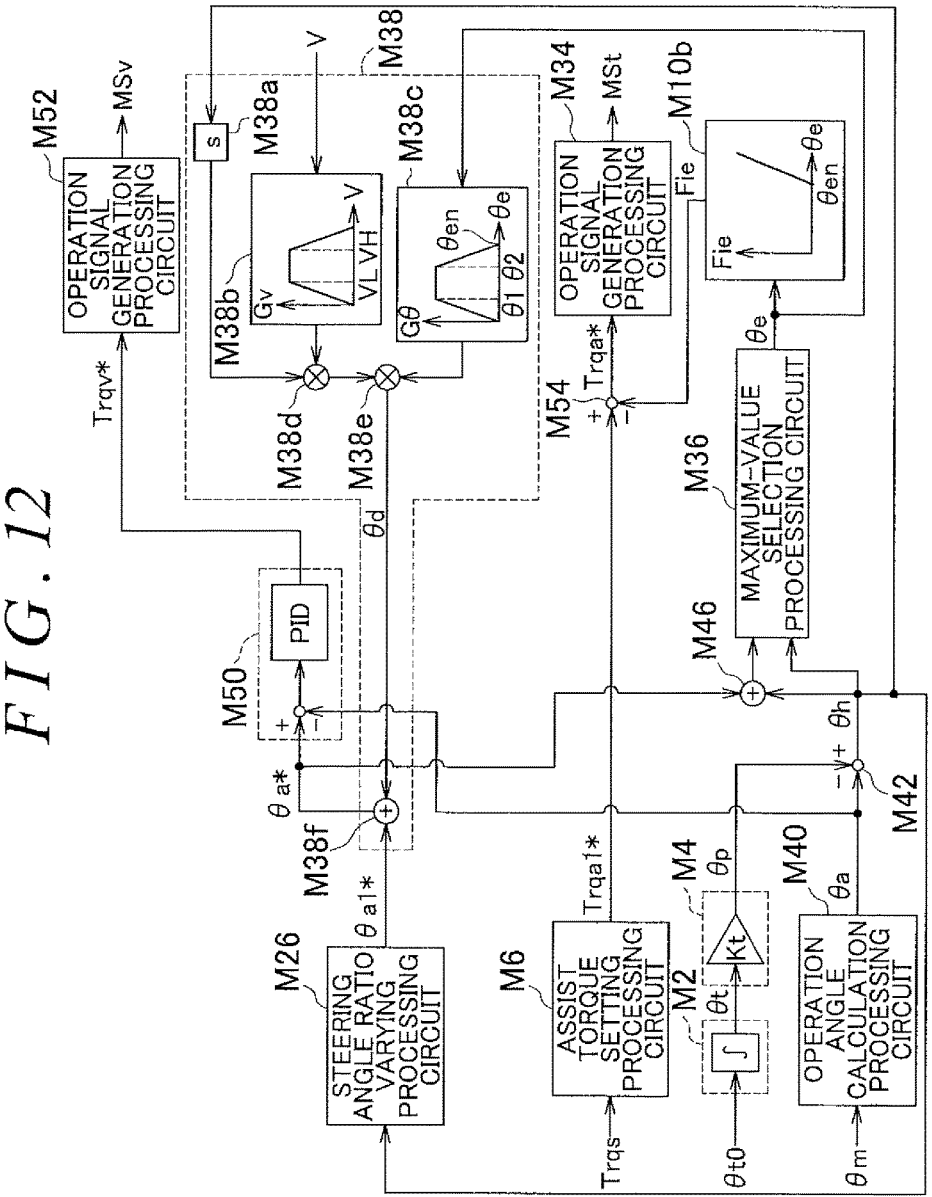
FIG. 12 is a block diagram of the ninth embodiment.

FIG. 12 illustrates a part of the processing executed by the control apparatus 80. The processing illustrated in FIG. 12 is a part of the processing implemented by the CPU 82 executing the program stored in the memory 84; FIG. 2 illustrates each type of implemented process. Processes in FIG. 12 corresponding to particular processes illustrated in FIG. 2 are denoted by the same reference numerals for convenience.

An operation angle calculation processing circuit M40 calculates the actual operation angle θa of the output shaft 108 from the rotation angle θm based on a speed reducing ratio determined according to a gear ratio between the rotary elements included in the reduction mechanism 106. A subtraction processing circuit M42 calculates the steering angle θh by subtracting the operation angle θa from the steered angle θp. The steering angle ratio varying processing circuit M26 sets a target operation angle θa1* based on the steering angle θh. Setting of the target operation angle θa1* is similar to setting of the target operation angle θa* in the first embodiment. In the differential steering processing circuit M38, the addition processing circuit M38f calculates the target operation angle θa* by adding the differential steering correction amount θa to the target operation angle θa1*.

A steering angle ratio feedback processing circuit M50 calculates the target steering angle ratio torque Trqv* as an amount of operation needed to feedback-control the operation angle θa so as to adjust the operation angle θa to the target operation angle θa*. Specifically, the target steering angle ratio torque Trqv* is the sum of output values from a proportional element, an integral element, and a differential element to each of which a value resulting from subtraction of the operation angle θa from the target operation angle θa* is input.

An operation signal generation processing circuit M52 generates an operation signal MSv for the inverter 110 that controllably adjusts the torque of the VGR motor 104 to the target steering angle ratio torque Trqv*, and outputs the operation signal MSv to the inverter 110. This may be performed similarly to the operation signal generation processing executed by the operation signal generation processing circuit M24.

The assist torque setting processing circuit M6 sets an assist torque Trqr1* based on the steering torque Trqs. This setting processing is similar to the setting of the assist torque Trqa* in the first embodiment.

A subtraction processing circuit M54 subtracts the limiting reaction force Fie from the assist torque Trqa1* and outputs the resultant value as the assist torque Trqa*. The operation signal generation processing circuit M34 generates the operation signal MSt that allows the torque of the steering operation side motor 56 to be controllably adjusted to the assist torque Trqa*, and outputs the operation signal MSt to the inverter 58. This may be performed similarly to the operation signal generation processing executed by the operation signal generation processing circuit M24.

The addition processing circuit M46 adds the target operation angle θa* to the steering angle θh and outputs the result. The maximum-value selection processing circuit M36 selects the maximum value θe from the steering angle θh and θh+θa* and output the selected value.

Now, effects of the present embodiment will be described. For example, if the vehicle speed V is between the low speed threshold VL and the high speed threshold VH, when the steering wheel 10 is turned to the right or the left to increase the absolute value of the variation speed of the steering angle θh, the output value from the multiplication processing circuit M38d is correspondingly increased. Thus, when the angle-sensitive gain Gθ does not lie in a region where the angle-sensitive gain Gθ has a small value, the target operation angle θa* is corrected using the differential steering correction amount θd such that the absolute value of the steered angle θp is larger at the target operation angle θa* than at the target operation angle θa1*.

When the user operates the steering wheel 10, a torque applied to the steering wheel 10 is transmitted to the rack shaft 46 via the output shaft 108. The steering operation side motor 56 generates a torque corresponding to the assist torque Trqa* and also transmits this torque to the rack shaft 46.

When the maximum value θe is equal to or larger than the common threshold θen, the assist torque Trqa* is lower by an amount equal to the limiting reaction force Fie than the assist torque Trqa* set by the assist torque setting processing circuit M6. The limiting reaction force Fie increases rapidly when the maximum value θe exceeds the common threshold θen. Thus, when the maximum value θe exceeds the common threshold θen, the assist torque Trqa* decreases rapidly. Thus, a high torque is needed to allow the steering wheel 10 to be operated so as to further increase the steering angle θh. This causes a variation in steering angle θh to be rapidly reduced.

When the maximum value θe reaches the common threshold θen, the angle-sensitive gain Gθ is zero, and thus, the differential steering correction amount θd is also zero. Therefore, the target operation angle θa* is equal to the target operation angle θa1*. This sufficiently suppresses possible vibration of the steering system resulting from the maximum value θe being equal to or larger than the common threshold θen.

With reference to the drawings, a tenth embodiment will be described below with differences from the ninth embodiment focused on.

Figure 13:
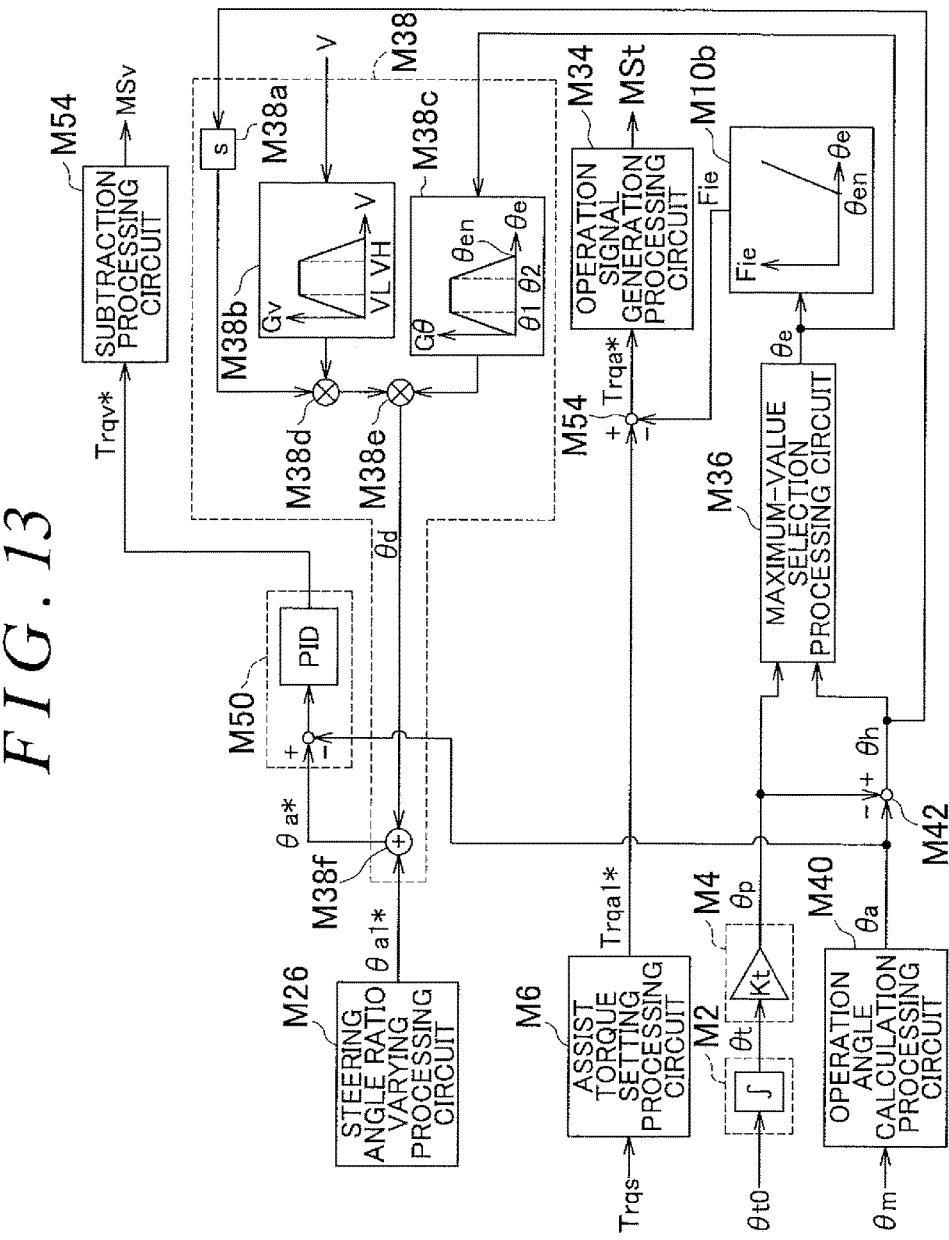
FIG. 13 is a block diagram of a tenth embodiment.

FIG. 13 illustrates a part of the processing executed by the control apparatus 80. The processing illustrated in FIG. 13 corresponds to partial modification of the processing illustrated in FIG. 12. Processes in FIG. 13 corresponding to particular processes illustrated in FIG. 12 are denoted by the same reference numerals for convenience. As depicted in FIG. 13, in the present embodiment, the maximum-value selection processing circuit M36 selects the maximum value θe from the steering angle θh and the steered angle θp.

With reference to the drawings, an 11th embodiment will be described below with differences from the first embodiment focused on.

Figure 14:
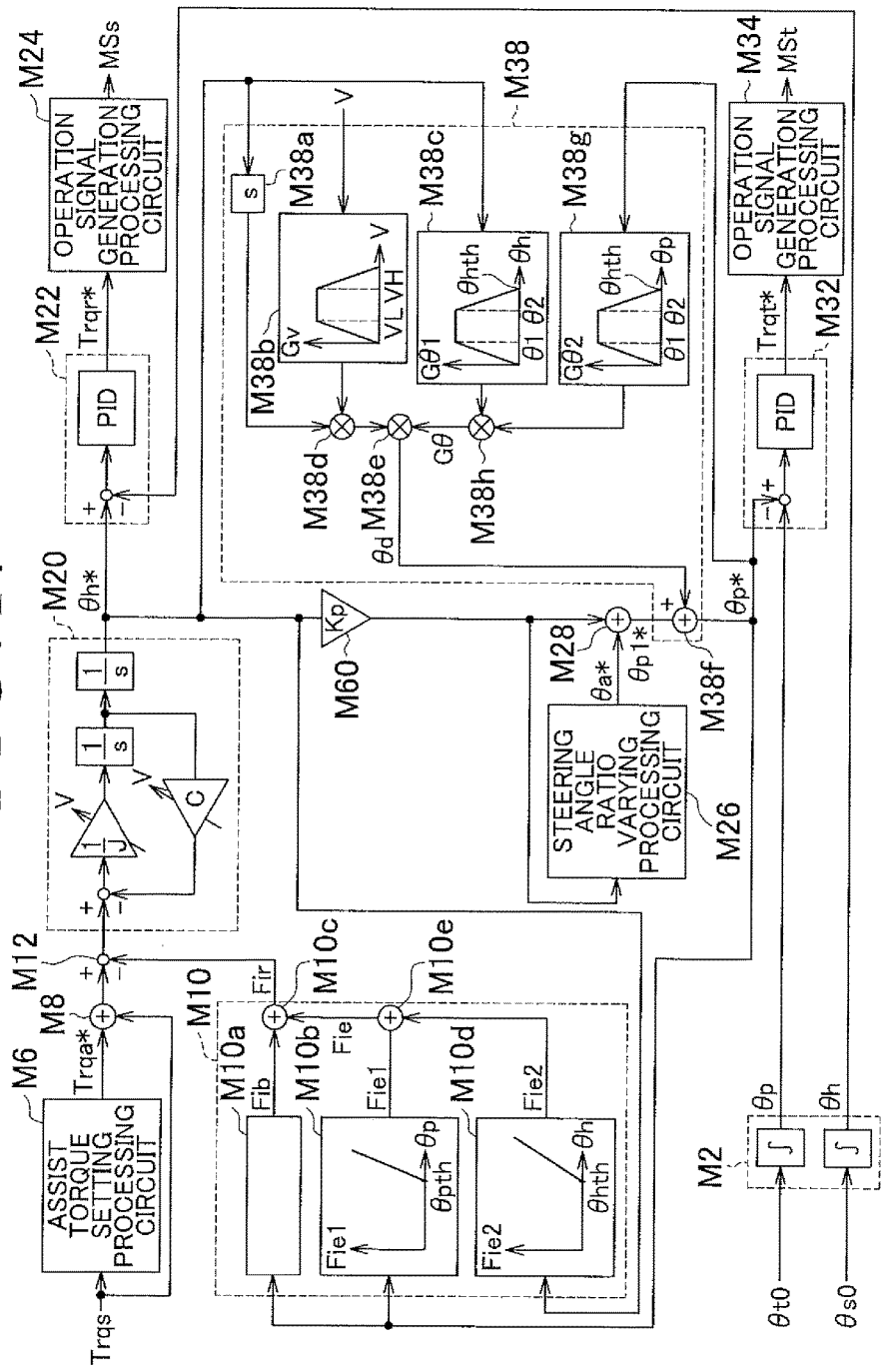
FIG. 14 is a block diagram of an eleventh embodiment.

FIG. 14 illustrates a part of the processing executed by the control apparatus 80. The processing illustrated in FIG. 14 corresponds to partial modification of the processing illustrated in FIG. 2. Processes in FIG. 14 corresponding to particular processes illustrated in FIG. 2 are denoted by the same reference numerals for convenience.

In the present embodiment, the measuring unit setting processing circuit M4 is not provided. Instead, a measurement conversion processing circuit M60 is provided, and the target steering angle θh* is made equal to the target steered angle θp* when the target operation angle θa* is zero.

In addition, in the reaction force setting processing circuit M10, the limiting reaction force setting processing circuit M10b sets a limiting reaction force Fie1 based on the target steered angle θp*. The limiting reaction force setting processing circuit M10b rapidly increases the limiting reaction force Fie1 when the magnitude of the target steered angle θp* is equal to or larger than a steered angle threshold θpth. The steered angle threshold θpth is set to a value that is smaller by a predetermined amount (slight amount) than the upper limit value θpH that is the steered angle θp obtained when the rack shaft 46 is displaced in the axial direction until the rack shaft 46 comes into contact with the rack housing 44. In the reaction force setting processing circuit M10, the limiting reaction force setting processing circuit M10d sets a limiting reaction force Fie2 based on the target steering angle θh*. The limiting reaction force setting processing circuit M10d rapidly increases the limiting reaction force Fie2 when the magnitude of the target steering angle θh* is equal to or larger than a steering angle threshold θhth. The steering angle threshold θhth is set to a value that is smaller by a predetermined amount (slight amount) than the upper limit value θpH that is the steered angle θp determined according to the length of the spiral cable 68. The addition processing circuit M10e calculates the limiting reaction force Fie by adding the limiting reaction force Fief and the limiting reaction force Fie2 together.

In the differential steering processing circuit M38, the angle-sensitive gain setting processing circuit M38c sets an angle-sensitive gain Gθ1 based on the target steering angle θh*. The angle-sensitive gain setting processing circuit M38c sets the value of the angle-sensitive gain Gθ1 to decrease consistently with the decrease of the steering angle θh when the target steering angle θh* is equal to or smaller than the first angle θ1, or the steering angle θh at which the deviation with respect to the neutral position is equal to or smaller than a specified amount. When the target steering angle θh* is equal to or larger than a second angle θ2 that is smaller by a predetermined amount than the steering angle threshold θhth, the angle-sensitive gain setting processing circuit M38c sets the value of the angle-sensitive gain Gθ1 to decrease as the steering angle θh increases. In particular, the angle-sensitive gain setting processing circuit M38c sets the value of the angle-sensitive gain Gθ1 to zero when the steering angle θh is equal to or larger than the steering angle threshold θhth. In the differential steering processing circuit M38, an angle-sensitive gain setting processing circuit M38g sets an angle-sensitive gain Gθ2 based on the target steered angle θp*. The angle-sensitive gain setting processing circuit M38g sets the value of the angle-sensitive gain Gθ2 to decrease consistently with the decrease of the steered angle θp when the target steered angle θp* is equal to or smaller than the first angle θ1 that is the steered angle θp at which the deviation with respect to the neutral position is equal to or smaller than the specified amount. When the target steered angle θp* is equal to or larger than the second angle θ2 that is smaller by the predetermined amount than the steering angle threshold θpth, the angle-sensitive gain setting processing circuit M38c sets the value of the angle-sensitive gain Gθ2 to decrease as the steered angle θp increases. In particular, the angle-sensitive gain setting processing circuit M38c sets the value of the angle-sensitive gain Gθ2 to zero when the steered angle θp is equal to or larger than the steered angle threshold θpth. Different values are set for the first angle θ1 and the second angle θ2 utilized by the angle-sensitive gain setting processing circuit M38c and the angle-sensitive gain setting processing circuit M38g, respectively. In the differential steering processing circuit M38, a multiplication circuit M38b calculates the angle-sensitive gain Gθ by multiplying the angle-sensitive gain. Gθ1 by the angle-sensitive gain Gθ2.

The above-described difference calculation processing circuit M38a, basic-gain setting processing circuit M38b, and multiplication processing circuit M38d correspond to the correction amount calculation processing circuit in SUMMARY OF THE INVENTION.

At least one of the matters of the above-described embodiments may be modified as follows.

A modification of the target steered angle setting processing circuit will be described below. In the first to eighth and eleventh embodiments, the target steered angle setting processing circuit includes the assist torque setting processing circuit M6, the reaction force setting processing circuit M10, the addition processing circuit M8, the deviation calculation processing circuit M12, the target steering angle calculation processing circuit M20, the steering angle ratio varying processing circuit M26, and the addition processing circuit M28. However, the invention is not limited to this. For example, the limiting reaction force setting processing circuit M10b may be omitted from the reaction force setting processing circuit M10. In the target steering angle calculation processing circuit M20, the target steering angle θh* may be set using a model formula expressed by Equation (c2) instead of the model formula expressed by Equation (c1) described above.

$$\Delta = K \cdot \theta h^* + C \cdot \theta h^{*\prime} + J \cdot \theta h^{*\prime}$$ (c2)

A spring constant K is a modeled effect on the vehicle and is determined in accordance with specifications for a suspension and wheel alignment.

For example, the first to eighth embodiments may include a target steered angle calculation processing circuit that calculates the target steered angle θp1* based on the output value from the deviation calculation processing circuit M12. The target steered angle setting processing circuit may include the target steered angle calculation processing circuit, the assist torque setting processing circuit M6, the reaction force setting processing circuit M10, the addition processing circuit M8, and the deviation calculation processing circuit M12. In this case, the target steering angle θh* may be a value resulting from subtraction of the target operation angle θa* from the target steered angle θp1*.

In the first to eighth embodiments, the steering angle ratio varying processing circuit M26 and the addition processing circuit M28 may be omitted, and the target steering angle θh* may be the same as the target steered angle θp* not corrected using the differential steering correction amount θd.

A modification of the differential steering processing circuit will be described below. In the above-described embodiments, the basic-gain setting processing circuit M38b reduces the basic gain Gv when the vehicle speed V is low. However, the invention is not limited to this. For example, the basic gain Gv may have a constant value except when the vehicle speed V is high. It is also not essential to reduce the basic gain Gv when the vehicle speed V is high. For example, the basic gain Gv may have a constant value except when the vehicle speed is low. It is not essential to variably set the basic gain Gv according to the vehicle speed V.

A modification of the steering operation processing circuit will be described below. In the ninth and tenth embodiments, the steering operation processing circuit that outputs the operation signal MSv to the variable-steering-angle-ratio actuator 100 includes the assist torque setting processing circuit M6, the limiting reaction force setting processing circuit M10b, the subtraction processing circuit M54, and the operation signal generation processing circuit M34. However, also in the ninth and tenth embodiments, for example, a steering operation processing circuit may be provided which outputs the operation signal MSt to the steering operation actuator 40 in the first to eighth embodiments. That is, the operation signal MSt may be generated by the assist torque setting processing circuit M6, the reaction force setting processing circuit M10, the addition processing circuit M8, the deviation calculation processing circuit M12, the target steering angle calculation processing circuit M20, the steering angle ratio varying processing circuit M26, the addition processing circuit M28, the steered angle feedback processing circuit M32, and the operation signal generation processing circuit M34 in the processing in FIG. 2.

A modification of the steering limitation processing circuit will be described. In the above-described embodiments, the steering limitation processing circuit includes the angle-sensitive gain setting processing circuit M38c (38g) and the multiplication processing circuit M38e (M38h). However, the invention is not limited to this. Specifically, the angle-sensitive gain setting processing circuit M38c (38g) is not limited to the angle-sensitive gain setting processing circuit illustrated in the above-described embodiments. For example, the angle-sensitive gain Gθ (Gθ1, Gθ2) need not be reduced near the neutral position. However, in this case, desirably, a dead zone processing circuit is provided between the difference calculation processing circuit M38a and the multiplication processing circuit M38d to correct and reduce the absolute value of the output value from the difference calculation processing circuit M38a near the neutral position.

In the first to tenth embodiments, the angle-sensitive gain Gθ is gradually reduced as the maximum value θe increases from the second angle θ2 that is smaller by the predetermined amount than the common threshold θen to the common threshold θen. However, the invention is not limited to this. For example, the angle-sensitive gain Gθ may be reduced from one to zero in the steps of the common threshold θen or a value that is smaller by the predetermined amount than the common threshold θen. For example, it is not essential that the angle-sensitive gain Gθ is zero at the common threshold θen, and the angle-sensitive gain Gθ may be a value that is slightly larger than zero.

In the eleventh embodiment, when the target steering angle θh* is equal to or larger than the second angle θ2, the value of the angle-sensitive gain Gθ1 decreases as the target steering angle θh* increases. However, the invention is not limited to this. For example, the angle-sensitive gain Gθ1 may be varied from one to zero in a step-by-step manner by setting the target steering angle θh* to the steering angle threshold θhth or a value that is smaller by a predetermined amount (slight amount) than the steering angle threshold θhth. Furthermore, it is also not essential that the angle-sensitive gain Gθ1 is zero when the target steering angle θh* is equal to or larger than the steering angle threshold θhth, and the angle-sensitive gain Gθ1 may be a value that is larger by a predetermined amount (slight amount) than zero. Similarly, in the eleventh embodiment, when the target steered angle θp* is equal to or larger than the second angle θ2, the value of the angle-sensitive gain Gθ2 decreases as the target steered angle θp* increases. However, the invention is not limited to this. For example, the angle-sensitive gain Gθ2 may be varied from one to zero in a step-by-step manner by setting the target steered angle θp* to the steered angle threshold θpth or a value that is smaller by a predetermined amount (slight amount) than the steered angle threshold θpth. Furthermore, it is also not essential that the angle-sensitive gain Gθ2 is zero when the target steered angle θp* is equal to or larger than the steered angle threshold θpth, and the angle-sensitive gain Gθ2 may be a value that is larger by a predetermined amount (slight amount) than zero.

For example, instead of the processing illustrated in FIG. 2, a processing circuit may be provided which multiplies the output value from the difference calculation processing circuit M38a by the angle-sensitive gain Gθ having a large value that is equal to or smaller than the first angle θ1 and that is equal to or larger than the second angle θ2, and a processing circuit may also be provided which subtracts an output value from the above-described processing circuit from a value resulting from multiplication of the output value from the difference calculation processing circuit M38a by the basic gain Gv.

A modification of the threshold (θen) will be described. (a) In the above-described, a pair of parameters including the steering angle and the steered angle is a comparison target for the threshold. However, the invention is not limited to this. For example, for a four-wheel drive vehicle, three parameters may be used including the steered angle of front wheels, the steered angle of rear wheels, and the steering angle. In this case, instead of the use of the maximum-value selection processing circuit M36 in the first to tenth embodiments, selection of the maximum value θe of the three parameters may be performed. In the eleventh embodiment, angle-sensitive gains Gθ1, Gθ2, Gθ3 may be calculated from the three parameters to set the angle-sensitive gain Gθ to Gθ1·Gθ2·Gθ3. For the four-wheel drive vehicle, when the four steered wheels have different steered angles, five parameters may be used which include four steered angles and one steering angle.

A single parameter may be used. That is, for example, the spiral cable 68 is provided with a margin, and the steered angle is controllably adjusted to the steered angle threshold or smaller regardless of the steering angle ratio. Since the spiral cable 68 is prevented from being irreversibly stretched, the steered angle may be the only parameter. Furthermore, for example, in a case where the spiral cable has no margin and the steering angle is controllably adjusted to the steering angle threshold or smaller regardless of the steering angle ratio, the rack shaft 46 does not come into contact with the rack housing 44, and thus, the steering angle may be the only parameter.

(b) The case where the use of a common threshold for a plurality of thresholds is not adopted is not limited to the eleventh embodiment. For example, the target steering angle θh* and the target steered angle θp1* may be used as in the third and fourth embodiments, the steering angle θh and the steered angle θp may be used as in the fifth to eighth and tenth embodiments, or the steering angle θh and θh+θa* may be used as in the ninth embodiment. Even in these cases, a common calculation parameter is desirably used for the limiting reaction force Fie and the angle-sensitive gain Gθ.

In the first to eighth and eleventh embodiments, the reaction force increase processing circuit includes the reaction force setting processing circuit M10, the deviation calculation processing circuit M12, the target steering angle calculation processing circuit M20, the steering angle feedback processing circuit M22, and the operation signal generation processing circuit M24. However, the invention is not limited to this. For example, in the eleventh embodiment, the limiting reaction force Fie may be the maximum value of the limiting reaction force Fie1 and the limiting reaction force Fie2 instead of the sum of the limiting reaction force Fie1 and the limiting reaction force Fie2.

Provision of the reaction force increase processing circuit is not essential. Even without the reaction force increase processing circuit, for example, in the above-described embodiments, the rack shaft 46 is displaced in the axial direction and comes into contact with the rack housing 44 to determine the upper limit value θpH of the steered angle θp. The spiral cable 68 determines the upper limit value θhH of the steering angle θH. Thus, near the upper limit values θpH and θhH, the magnitude of the increase and reduction correction amount for the steered angle θp set by the differential steering processing circuit M38 is desirably limited.

A modification of the steering angle control processing circuit will be described below. In the above-described embodiments, the steering angle feedback processing circuit M22 and the operation signal generation processing circuit M24 are included in the steering angle control processing circuit. However, the invention is not limited to this. For example, the steering angle feedback processing circuit M22 may calculate the amount of operation (target reaction force torque Trqr*) for the reaction force actuator 20 based on the sum of the respective output values from a proportional element and a differential element to each of which a value resulting from subtraction of the steering angle θh from the target steering angle θh* is input.

A modification of the steered angle feedback processing circuit will be described below. The steered angle feedback processing circuit is not limited to the circuit that calculates the amount of operation (target reaction force torque Trqr*) for the steering operation actuator 40 based on the sum of the respective output values from a proportional element, an integral element, and a differential element to each of which a value resulting from subtraction of the steered angle θp from the target steered angle θp* is input. For example, the steered angle feedback processing circuit may calculate the amount of operation for the steering operation actuator 40 based on the sum of the respective output values from a proportional element and a differential element to each of which a value resulting from subtraction of the steered angle θp from the target steered angle θp* is input.

A modification of the steering angle ratio feedback processing circuit will be described. The steering angle ratio feedback processing circuit is not limited to the calculation of the amount of operation (target steering angle ratio torque Trqv*) for the variable-steering-angle-ratio actuator 100 based on the sum of the respective output values from a proportional element, an integral element, and a differential element to each of which a value resulting from subtraction of the operation angle θa from the target operation angle θa* is input. For example, the steering angle ratio feedback processing circuit may calculate the amount of operation for the variable-steering-angle-ratio actuator 100 based on the sum of the respective output values from a proportional element and a differential element to each of which a value resulting from subtraction of the operation angle θa from the target operation angle θa* is input.

A modification of the steering operation actuator (40) will be described below. The steering operation side motor 56 is not limited to the SPMSM but may be, for example, an IPMSM. Furthermore, the invention is not limited to the rack-and-pinion type. For example, a rack cross type, a rack parallel type, or a rack coaxial type may be adopted.

A modification of the configuration with the variable-steering-angle-ratio actuator will be described below. The ninth and tenth embodiments may include a sensor that detects the steering angle. In this case, the steering angle θh may be acquired based on a detection value from the sensor.

In the ninth and tenth embodiments, provision of the steering operation actuator 40 is not essential. Instead of the steering operation actuator 40 including the steering operation side motor 56, a hydraulic actuator may be provided.

A modification of the steering system will be described below. The invention is not limited to the steering system in which the steering angle ratio that is the ratio between the steered angle of the steered wheels 30 and the steering angle of the steering wheel 10 is variable. For example, even when the steering shaft 22 and the pinion shaft 42 are integrated together in FIG. 1 and the steering angle ratio varying processing circuit M26 and the addition processing circuit M28 are omitted in FIG. 2, the differential steering processing circuit M38 effectively includes the angle-sensitive gain setting processing circuit M38c.

A modification of the steering control apparatus will be described below. The invention is not limited to the steering control apparatus including the CPU 82 and the memory 84 to execute software processing. For example, at least a part of the software processing in the above-described embodiments may be executed by dedicated hardware (ASIC). That is, in the first embodiment, hardware may be used to execute the processing in the assist torque setting processing circuit M6, the reaction force setting processing circuit M10, the addition processing circuit M8, the deviation calculation processing circuit M12, and the target steering angle calculation processing circuit M20. Furthermore, the CPU 82 may acquire the target steering angle θh* from the hardware.

Other modifications will be described below. The reaction force motor 26 and the VGR motor 104 are not limited to the SPMSMs but may be, for example, IPMSMs.

What is claimed is:

1. A steering control apparatus that outputs an operation signal to a steering system, the steering control apparatus comprising:
   a central processor operatively communicating with the steering system to control a steering operation actuator and a reaction force actuator, the central processor being configured to:
   transmit the operation signal to the steering system, the operation signal causing the steering system to steer steered wheels of a vehicle, in accordance with an operation of a steering wheel;
   increase or decrease an amount of steering operation performed by the steering system on the steered wheels due to the operation signal, the amount of steering operation being increased or decreased according to a variation speed of a steering angle due to the operation of the steering wheel causing the steering angle to vary, which is a rotation angle of the steering wheel, the increase or decrease of the steering operation being performed by adding a correction amount of a force to the amount of steering operation in a direction of the variation speed of the steering angle; and
   limit the increase or decrease of the steering operation in response to at least one of the steered angle of the steered wheels and the steering angle reaching a predetermined threshold value, such that fluctuations in the increase or decrease of the steering operation is limited at predetermined values of at least one of the steered angle of the steered wheels and the steering angle, which reduces vibration in the steering system.

2. The steering control apparatus according to claim 1, wherein the processor is configured to:
   limit the increase or decrease of the steering operation when at least the steered angle reaches a steered angle threshold,
   set a target steered angle that is a target value of the steered angle in accordance with operation of the steering wheel, and output an operation signal to the steering operation actuator in order to controllably adjust the steered angle to the target steered angle, and
   correct a magnitude of the target steered angle by increasing or decreasing the magnitude according to the variation speed of the steering angle.

3. The steering control apparatus according to claim 2, wherein the processor is configured to:
   controllably increase a reaction force that is a force resisting operation of the steering wheel by outputting an operation signal to the steering system when the steered angle is equal to or larger than the steered angle threshold, and
   based on one of: (i) the corrected target steered angle, (ii) the target steered angle, and (iii) a detection value of the steered angle, perform increase control on the reaction force and limit the increase or decrease of the amount of steering operation.

4. The steering control apparatus according to claim 3, wherein:

the reaction force actuator applies the reaction force resisting operation of the steering wheel to the steering wheel, the steering operation actuator applies a force that steers the steered wheels at least during a state in which power transmission between the steering wheel and the steered wheels is blocked, and the processor is configured to:
  limit a limiting reaction force to a value larger than zero when the steered angle is equal to or larger than the steered angle threshold,
  set a target steering angle that is a target angle of the steering angle based on the set limiting reaction force, and
  control the reaction force actuator in order to perform feedback control for causing the detection value of the steering angle to be adjusted to the target steering angle.

5. The steering control apparatus according to claim 2, wherein the processor is configured to:
  calculate a correction amount by which the target steered angle is corrected according to the variation speed of the steering angle, and
  correct and decrease a magnitude of the correction amount to limit the increase or decrease of the amount of steering operation when the steered angle reaches the steered angle threshold, and correct and decrease the magnitude of the correction amount when deviation of the steered angle with reference to a neutral position is equal to or smaller than a specified amount.

6. The steering control apparatus according to claim 1, wherein the processor is configured to:
  limit the increase or decrease of the steering operation when at least the steering angle reaches a steering angle threshold,
  set a target steered angle that is a target value of the steered angle in accordance with operation of the steering wheel, and output an operation signal to the steering operation actuator in order to controllably adjust the steered angle to the target steered angle, and
  correct the magnitude of the target steered angle by increasing or decreasing the magnitude according to the variation speed of the steering angle.

7. The steering control apparatus according to claim 6, wherein the processor is configured to:
  controllably increase a reaction force that is a force resisting operation of the steering wheel by outputting an operation signal to the steering system when the steering angle is equal to or larger than the steering angle threshold,
  limit the increase or decrease of the amount of steering operation when the steering angle reaches the steering angle threshold, and
  based on a detection value of the steering angle, increase the reaction force, and limit the increase or decrease of the amount of steering operation.

8. The steering control apparatus according to claim 6, wherein:
  the processor is configured to controllably increase a reaction force that is a force resisting operation of the steering wheel by outputting an operation signal to the steering system when the steering angle is equal to or larger than the steering angle threshold, the reaction force actuator applies a reaction force resisting operation of the steering wheel to the steering wheel, the steering operation actuator applies a force that steers the steered wheels at least during a state in which power transmission between the steering wheel and the steered wheels is blocked, and the processor is configured to:
  set a limiting reaction force to a value larger than zero when the steering angle is equal to or larger than the steering angle threshold,
  set a target steering angle that is a target angle of the steering angle based on the set limiting reaction force,
  control the reaction force actuator in order to controllably adjust a detection value of the steering angle to the target steering angle, and
  based on the target steering angle, increase the reaction force, and limit the increase or decrease of the amount of steering operation.

9. The steering control apparatus according to claim 6, wherein the processor is configured to:
  calculate a correction amount by which the target steered angle is corrected according to the variation speed of the steering angle,
  correct and decrease a magnitude of the correction amount as processing for limiting the increase or decrease of the amount of steering operation when the steering angle reaches the steering angle threshold, and
  correct and decrease the magnitude of the correction amount when deviation of the steering angle with respect to a neutral position is equal to or smaller than a prescribed amount.

10. The steering control apparatus according to claim 1, wherein the processor is configured to:
  correct and decrease the magnitude of an amount of increase or decrease in the amount of steering operation,
  gradually increase a decreased correction amount that is an amount by which the amount of increase or decrease is corrected and decreased as at least one of the steered angle and the steering angle increases from a value that is smaller by a predetermined amount than the threshold to a value at which the angle reaches the threshold, and
  set the amount of increase or decrease in the amount of steering operation to zero when at least one of the steered angle and the steering angle reaches the threshold.

11. The steering control apparatus according to claim 1, further comprising:
  a variable-steering-angle-ratio actuator that varies a steering angle ratio that is a ratio between the steering angle and the steered angle while transmitting a torque applied to the steering wheel to the steered wheels, wherein
  the processor is configured to:
    output an operation signal to change the steering angle ratio that is a ratio between the steering angle and the steered angle, and
    increase or decrease the amount of steering operation by increasing or reducing the steering angle ratio.

* * * * *